United States Patent
Izutani et al.

(10) Patent No.: US 8,950,047 B2
(45) Date of Patent: Feb. 10, 2015

(54) WELDING TIP REPLACEMENT APPARATUS, WELDING TIP REPLACEMENT SYSTEM, AND METHOD FOR REPLACING WELDING TIP

(75) Inventors: Shun Izutani, Fujisawa (JP); Reiichi Suzuki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 226 days.

(21) Appl. No.: 13/526,981

(22) Filed: Jun. 19, 2012

(65) Prior Publication Data
US 2013/0008003 A1  Jan. 10, 2013

(30) Foreign Application Priority Data
Jul. 6, 2011  (JP) .................................. 2011-149859

(51) Int. Cl.
| | | |
|---|---|---|
| B23P 6/00 | (2006.01) | |
| B23K 9/26 | (2006.01) | |
| B23K 9/32 | (2006.01) | |
| B25J 15/04 | (2006.01) | |

(52) U.S. Cl.
CPC ... *B23K 9/26* (2013.01); *B23K 9/32* (2013.01); *B25J 15/0416* (2013.01); *B25J 15/0491* (2013.01); *Y10S 483/902* (2013.01)
USPC ....................... 29/402.08; 483/902

(58) Field of Classification Search
CPC .......... B23K 9/08; B23K 9/123; B23K 9/295; B23K 9/26; B23K 9/173; B23K 9/32; B25J 15/04; B25J 15/0491; B25J 15/0416; B23P 6/005; B25B 27/00
USPC ........... 29/402.08, 402.11, 426.1, 426.5, 428, 29/520.55, 700, 712, 235; 219/136, 219/137.63; 483/901, 902
See application file for complete search history.

(56) References Cited

U.S. PATENT DOCUMENTS

| | | |
|---|---|---|
| 4,645,901 A | 2/1987 | Scholz et al. |
| 2003/0077137 A1 | 4/2003 | Rohm |
| 2012/0125903 A1 | 5/2012 | Izutani et al. |

FOREIGN PATENT DOCUMENTS

| | | |
|---|---|---|
| EP | 2 457 682 A1 | 5/2012 |
| JP | 60-71482 | 5/1985 |
| JP | 5-77044 A | 3/1993 |
| JP | 6-312266 | 11/1994 |
| JP | 10-99969 A | 4/1998 |
| JP | 11-347731 | 12/1999 |
| JP | 2001-105134 A | 4/2001 |
| JP | 2001-191288 | 7/2001 |
| JP | 2005-921 | 1/2005 |
| JP | 2010-149145 | 7/2010 |

OTHER PUBLICATIONS

The Extended European Search Report issued Jan. 8, 2013, in Application No. / Patent No. 12004812.9-2302.

*Primary Examiner* — John C Hong
(74) *Attorney, Agent, or Firm* — Oblon, Spivak, McClelland, Maier & Neustadt, L.L.P.

(57) ABSTRACT

A welding tip replacement apparatus is used for a welding torch that includes a tubular tip connection body, a tubular retaining member fitted over the tip connection body, and a tubular welding tip fitted within the tip connection body, the welding torch being configured such that displacing the retaining member toward the proximal end of the tip connection body along the axis of the tip connection body causes the welding tip axially fastened to the tip connection body to be released. The apparatus includes a first grasping mechanism grasping the retaining member, a second grasping mechanism grasping the welding tip protruding from the retaining member in a direction away from the distal end of the tip connection body, a first driving mechanism driving the first grasping mechanism axially, and a second driving mechanism driving the second grasping mechanism axially.

6 Claims, 15 Drawing Sheets

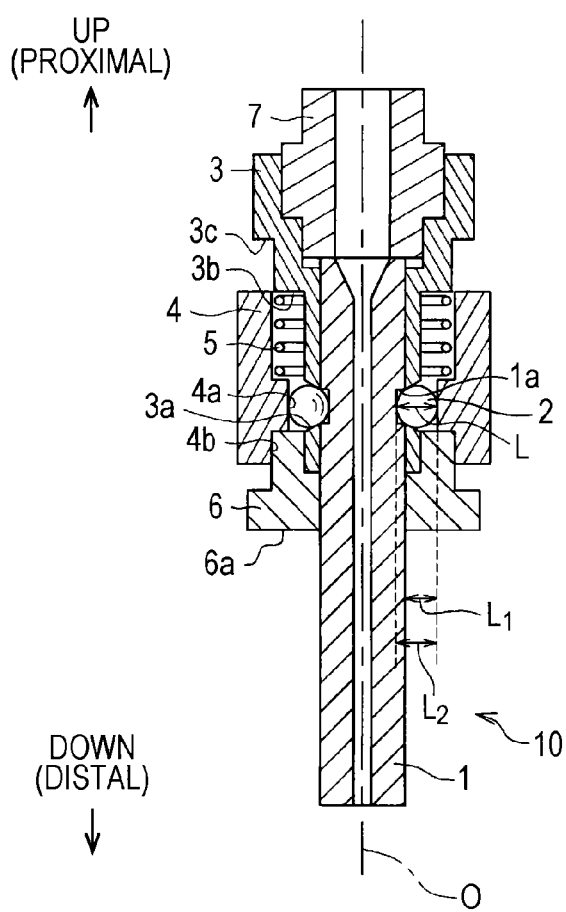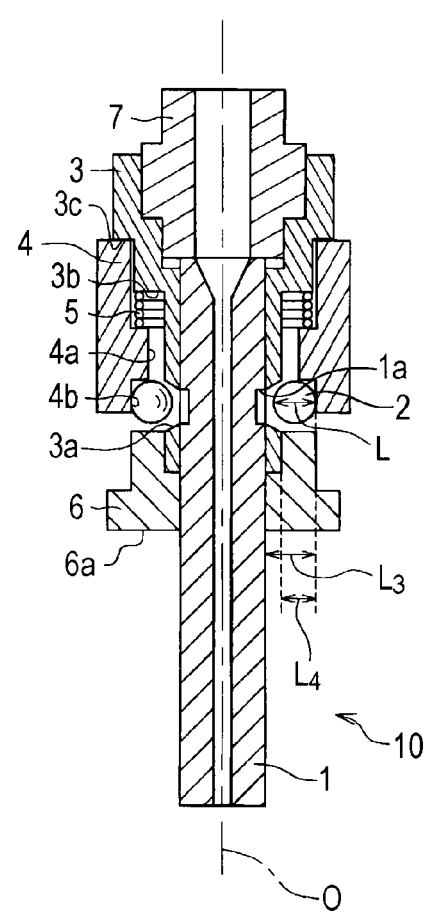

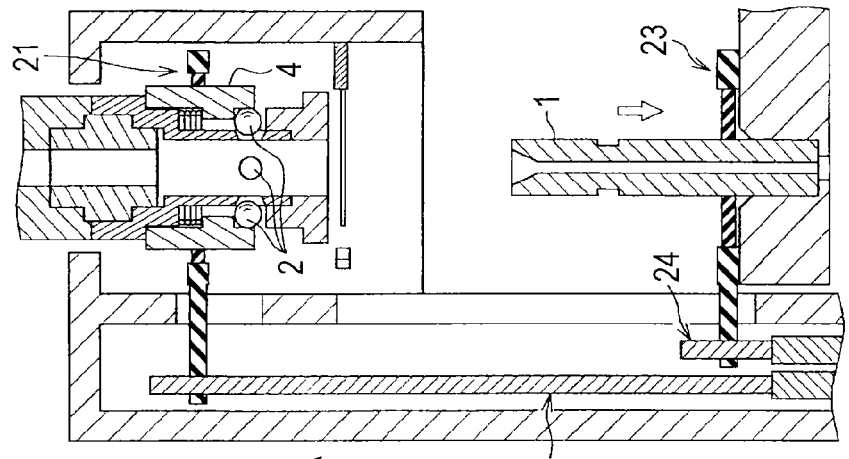
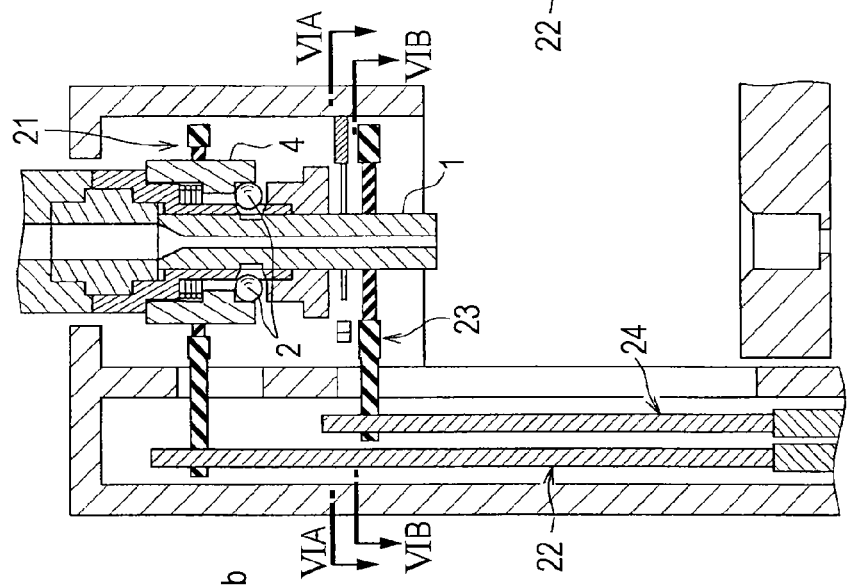
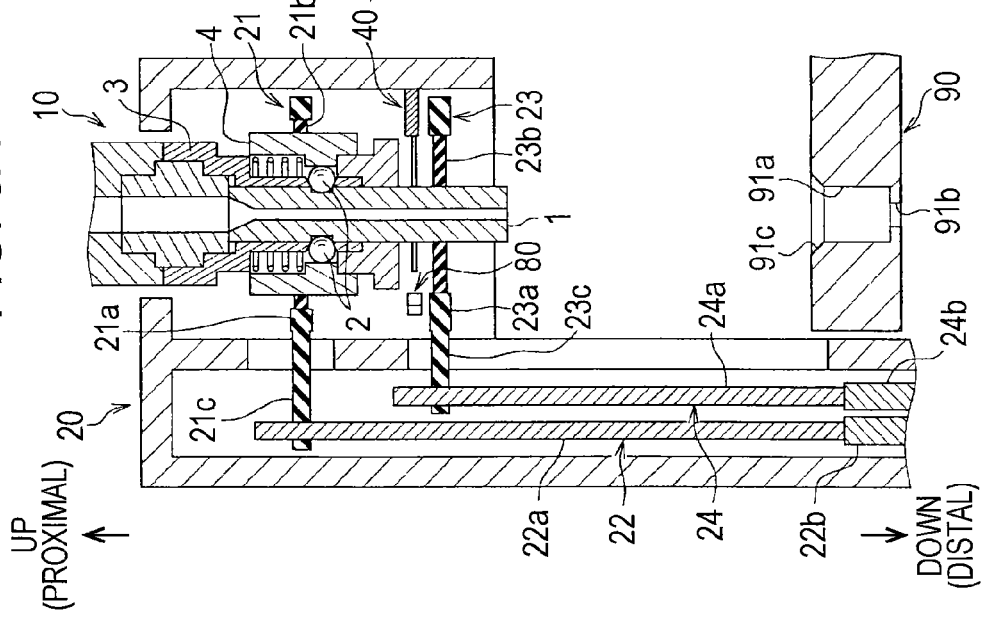

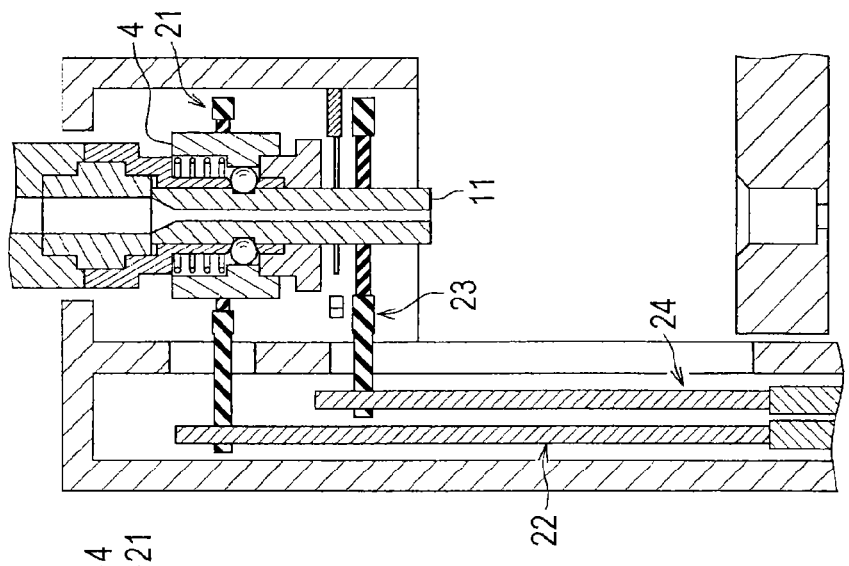
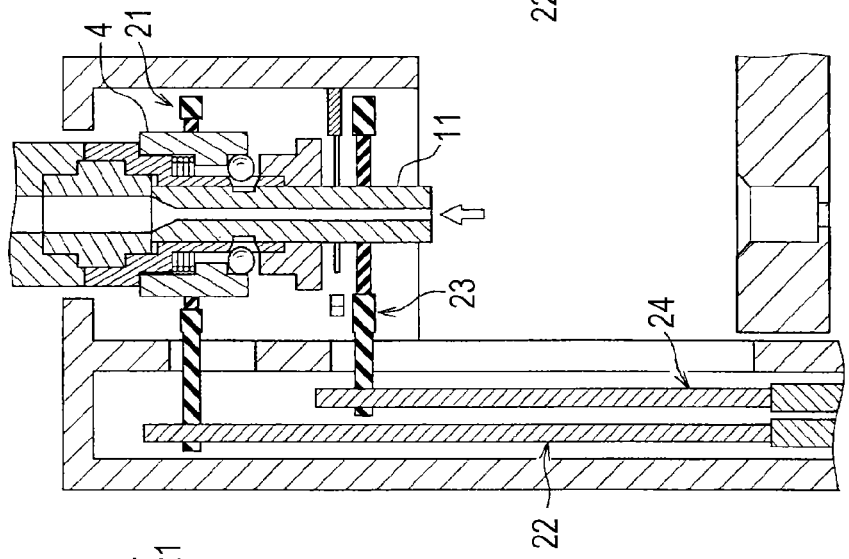
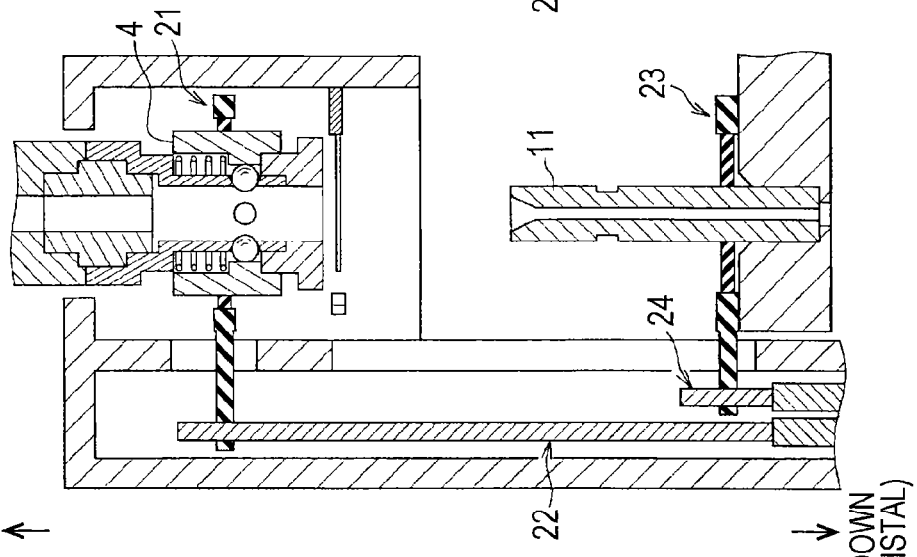

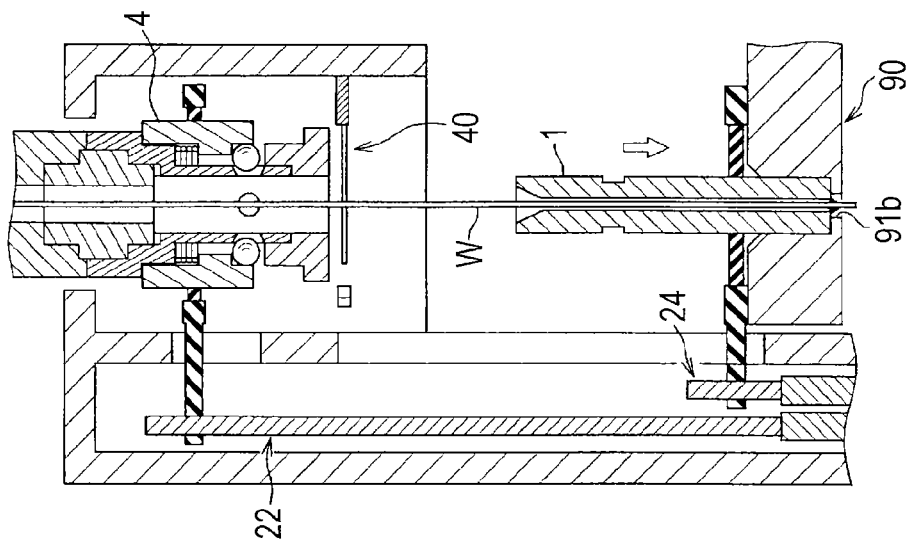
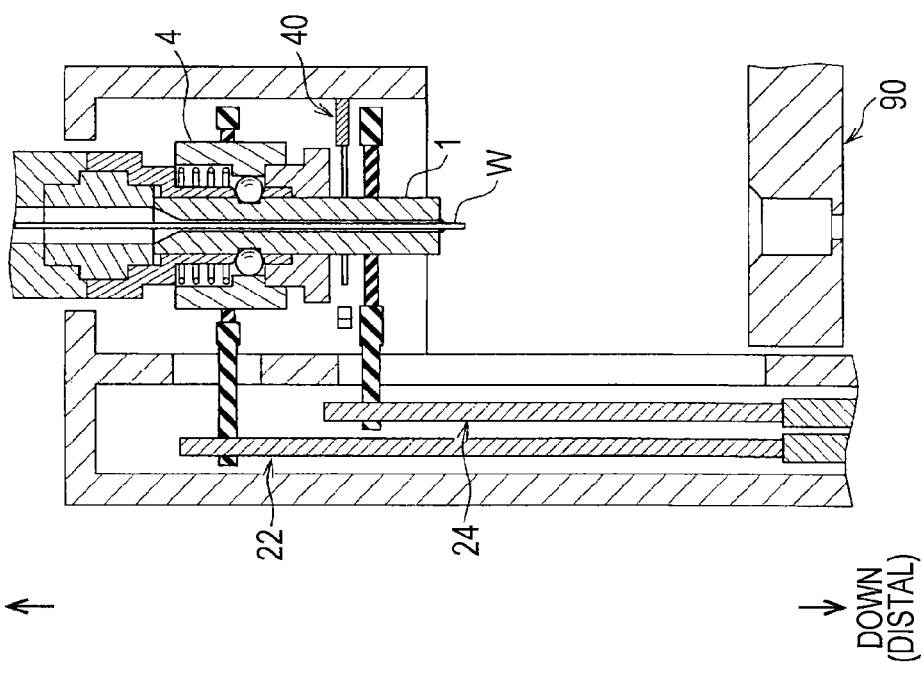

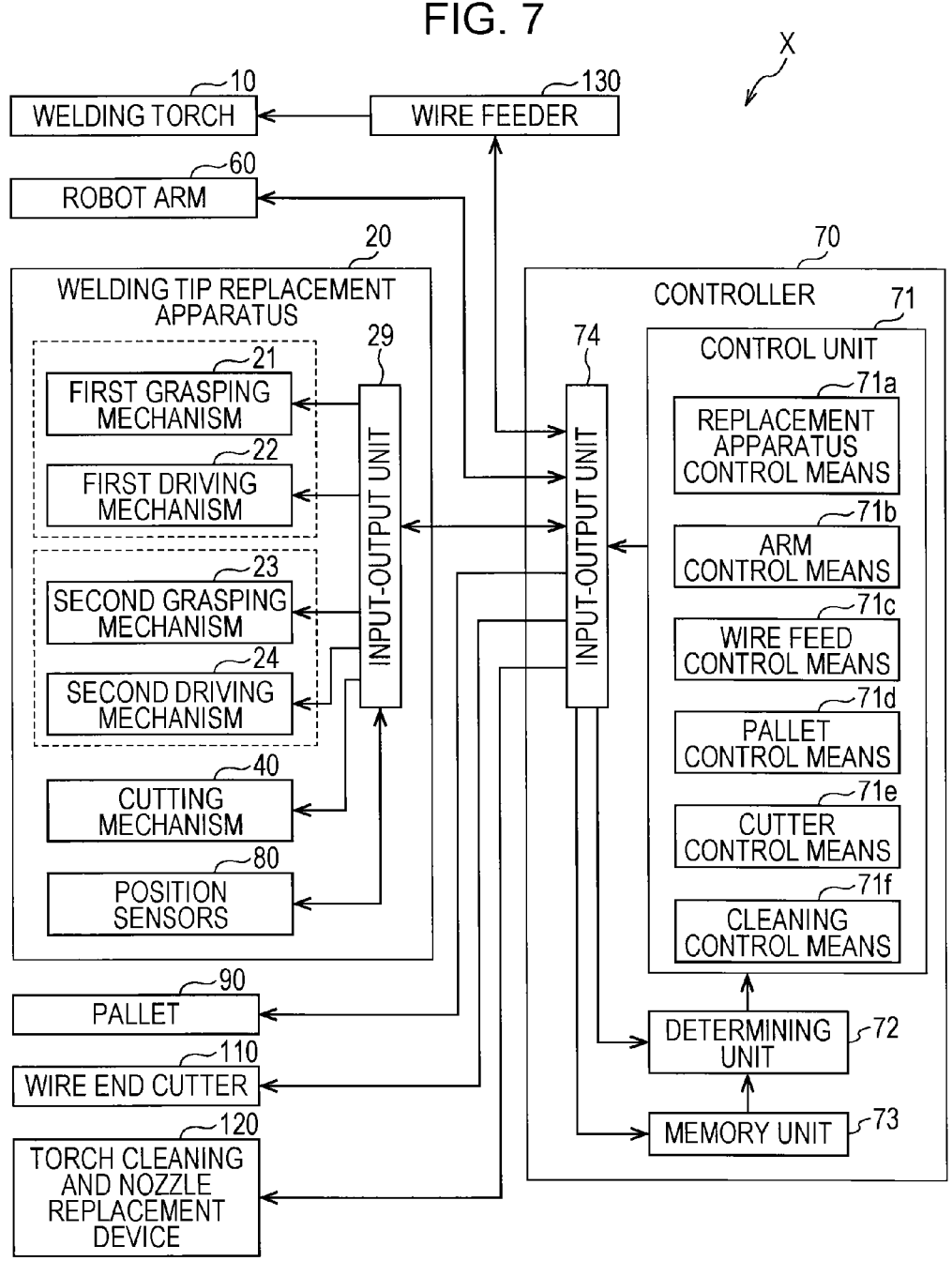

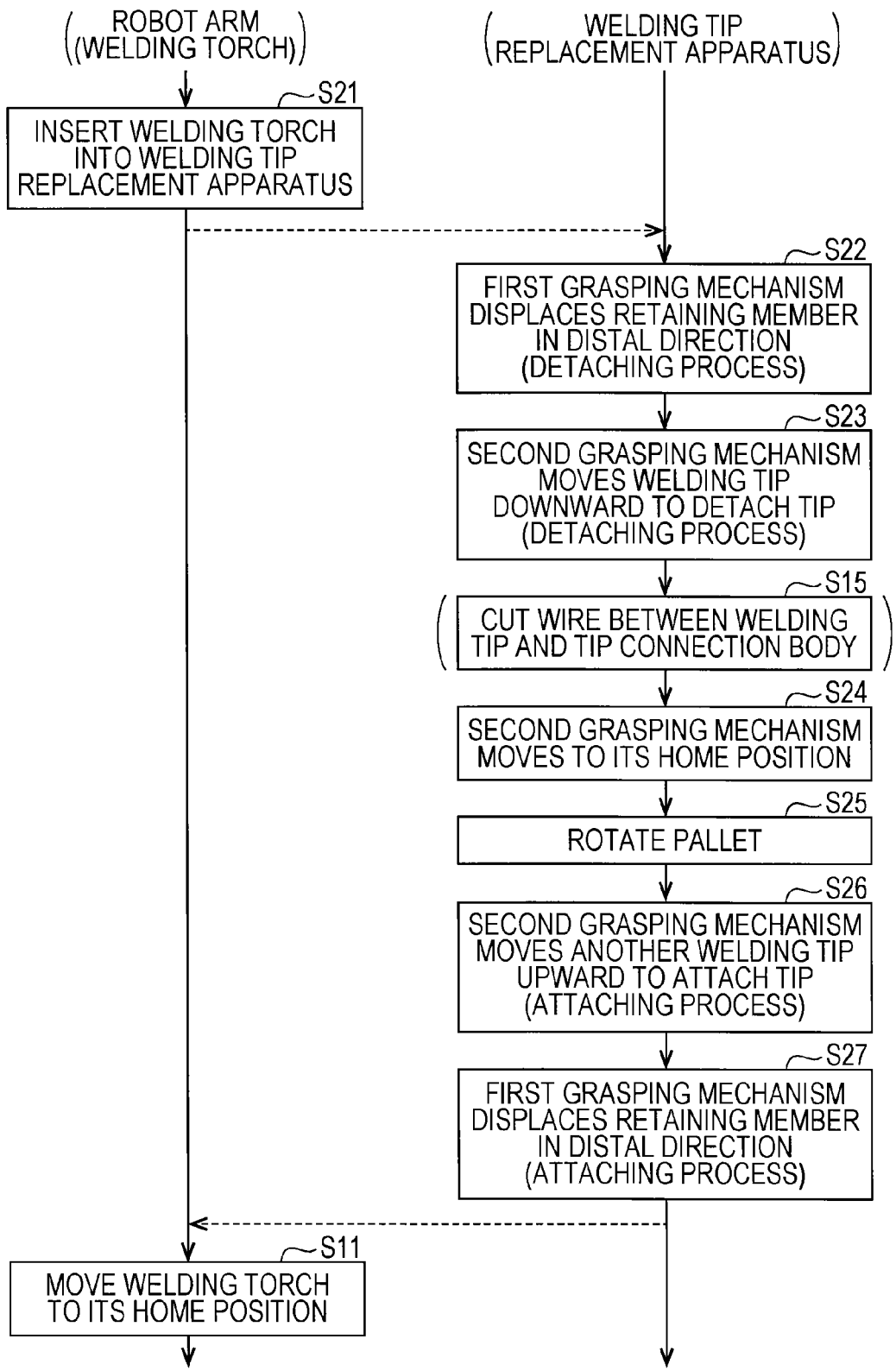

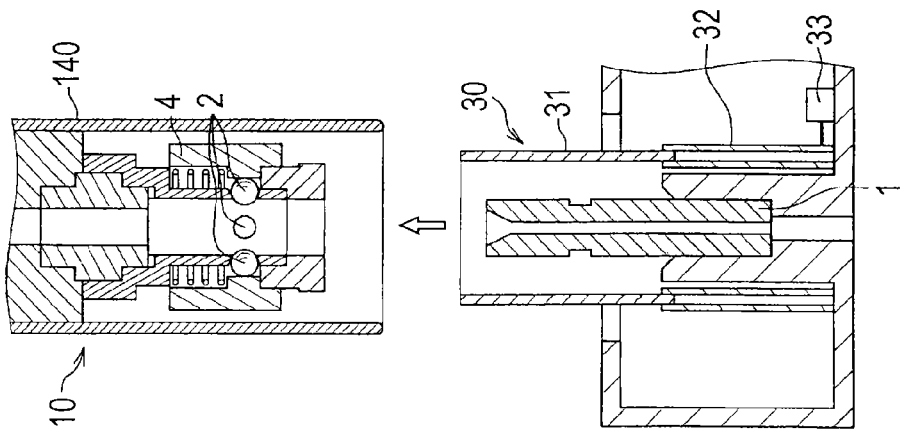
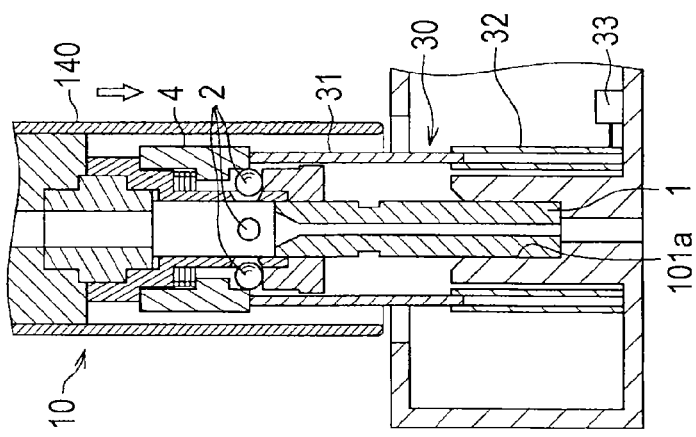
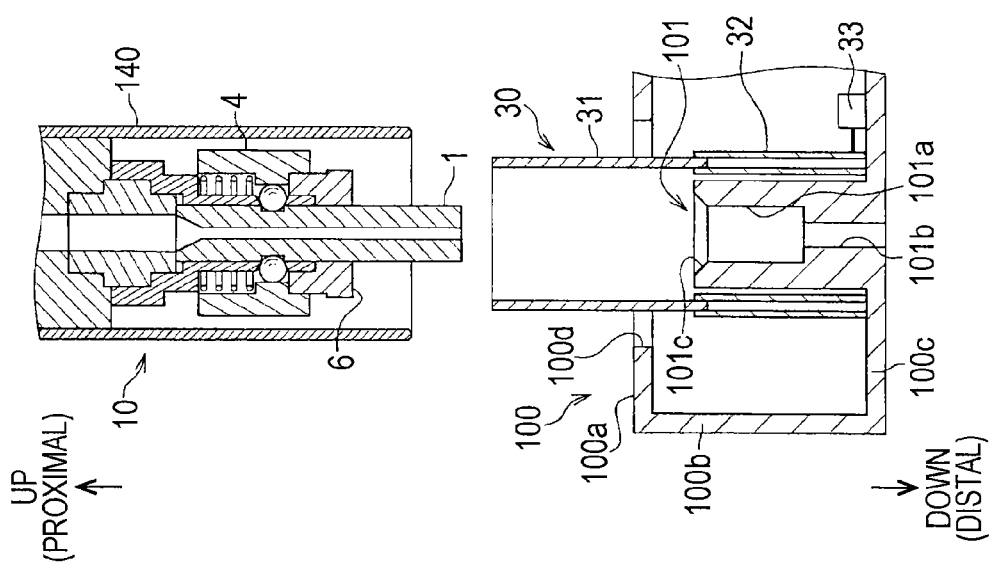

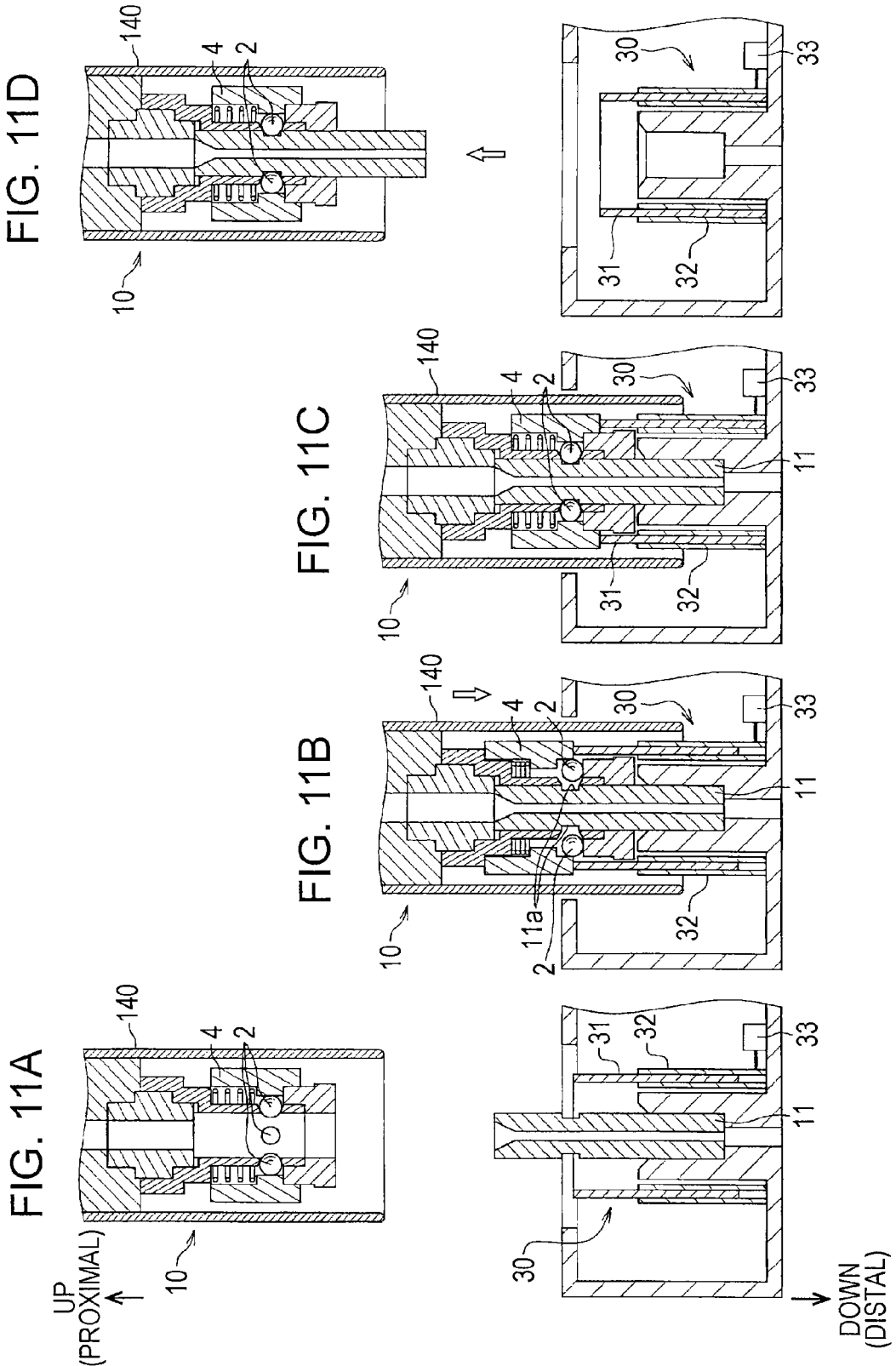

WELDING TIP REPLACEMENT APPARATUS, WELDING TIP REPLACEMENT SYSTEM, AND METHOD FOR REPLACING WELDING TIP

BACKGROUND OF THE INVENTION

1. Field of the Invention

The present invention relates an apparatus, system, and method for replacing a welding tip used for gas shielded arc welding.

2. Description of the Related Art

In gas shielded arc welding, a disposable copper electrode called a contact tip (hereinafter, referred to as a "welding tip") is typically used as a member for supplying current to a wire. The welding tip has a through-hole. The wire is continuously fed to the through-hole and current is supplied to the wire through the welding tip, thus generating an electric arc between the wire protruding from the distal end of the welding tip and a base material.

During gas shielded arc welding, the wire rubs against the inner surface of the through-hole at the distal end of the welding tip, so that relevant portions become worn. Accordingly, the inside diameter of the through-hole is increased, thus shifting a welding position or causing poor current supply to the wire. It is therefore necessary to periodically replace the welding tip.

In automatic long-time welding, such a welding tip replacing operation contributes to the availability of a welding facility.

Manual replacement of welding tips requires time and effort, which may significantly reduce the availability of the welding facility. Research, development, and practical application of welding tip replacement apparatuses capable of automatically replacing a welding tip are therefore in progress.

For example, Japanese Unexamined Patent Application Publication Nos. 6-312266 and 11-347731 disclose a small replacement apparatus capable of easily replacing a welding tip. Furthermore, Japanese Unexamined Patent Application Publication No. 2010-149145 discloses a replacement apparatus capable of dealing with different sized welding torches and different sized welding tips.

Each of techniques disclosed in the above-described three patent application publications relates to the welding tip replacement apparatus designed for a welding torch including a welding tip and a body (hereinafter, referred to as a "tip connection body") which are detachably engaged with each other in a screw threaded manner. Such a welding tip replacement apparatus, therefore, requires a rotator for rotating the welding tip. In addition, a mechanism for applying a large torque to the rotator is needed to securely attach the welding tip to the welding torch such that the welding tip is prevented from being easily detached from the welding torch and is also needed to detach the securely attached welding tip. Accordingly, such a welding tip replacement apparatus has to have a complicated structure.

SUMMARY OF THE INVENTION

Accordingly, it is an object of the present invention to provide a welding tip replacement apparatus with a simple structure, a welding tip replacement system, and a method for replacing a welding tip.

An aspect of the present invention provides a welding tip replacement apparatus for a welding torch that includes a tubular tip connection body, a tubular retaining member fitted over the tip connection body, a tubular welding tip fitted within the tip connection body, and an elastic member urging the retaining member along the axis of the tip connection body toward one end of the tip connection body, the welding torch being configured such that displacing the retaining member axially toward the other end of the tip connection body causes the welding tip axially fastened to the tip connection body to be released, the apparatus including the following elements. A first grasping mechanism grasps the retaining member. A second grasping mechanism grasps the welding tip protruding from the retaining member in a direction away from the one end or another welding tip. A first driving mechanism drives the first grasping mechanism axially toward the other end to release the welding tip fastened to the tip connection body and drives the first grasping mechanism axially toward the one end to fasten the other welding tip to the tip connection body. A second driving mechanism drives the second grasping mechanism axially in the direction away from the one end to detach the welding tip and drives the second grasping mechanism axially toward the other end to attach the other welding tip.

In this welding tip replacement apparatus, to detach the welding tip from the tip connection body, the first grasping mechanism grasping the retaining member is moved axially in a direction toward the other end (hereinafter, referred to as a "proximal direction") by the first driving mechanism, so that the welding tip fastened to the tip connection body through the retaining member is released. Then, the second grasping mechanism grasping the welding tip is moved axially in a direction away from the one end (hereinafter, referred to as a "distal direction") by the second driving mechanism, so that detachment of the welding tip is completed.

Whereas, to attach a welding tip to the tip connection body, the first grasping mechanism grasping the retaining member is moved axially toward the other end (in the proximal direction) by the first driving mechanism, thus providing a state (released state) in which a welding tip can be inserted into the tip connection body. Then, a prepared new welding tip (another welding tip) is grasped by the second grasping mechanism and the second grasping mechanism is moved axially toward the other end (in the proximal direction) by the second driving mechanism, so that the welding tip is inserted into the tip connection body. After that, the first grasping mechanism grasping the retaining member is moved axially toward the one end (in the distal direction) by the first driving mechanism, so that the welding tip is fastened to the tip connection body. Thus, attachment of the welding tip is completed.

Another aspect of the present invention provides a welding tip replacement apparatus for a welding torch that includes a tubular tip connection body, a tubular retaining member fitted over the tip connection body, a tubular welding tip fitted within the tip connection body, and an elastic member urging the retaining member along the axis of the tip connection body toward one end of the tip connection body, the welding torch being configured such that displacing the retaining member axially toward the other end of the tip connection body causes the welding tip axially fastened to the tip connection body to be released, the apparatus including a pressing member for pressing an end surface of the retaining member adjacent to the one end of the tip connection body toward the other end thereof, and a pressing driving mechanism that drives the pressing member axially toward the other end to release the welding tip fastened to the tip connection body and drives the pressing member axially in a direction away from the one end to fasten another welding tip to the tip connection body.

In this welding tip replacement apparatus, to detach the welding tip from the tip connection body, the pressing member is moved axially toward the other end (in the proximal direction) by the pressing driving mechanism such that the retaining member is pressed toward the other end (in the proximal direction), thus providing the released state in which the welding tip fastened to the tip connection body through the retaining member is released. The released welding tip is moved axially in the direction away from the one end (in the distal direction), so that detachment of the welding tip is completed.

Whereas, to attach a welding tip to the tip connection body, the pressing member is moved axially toward the other end (in the proximal direction) by the pressing driving mechanism such that the retaining member is pressed toward the other end (in the proximal direction), thus providing the released state in which a welding tip can be inserted into the tip connection body. Then, a prepared new welding tip (another welding tip) is inserted into the tip connection body, and after that, the pressing member is moved axially in the direction away from the one end (in the distal direction) by the pressing driving mechanism, so that the welding tip is fastened to the tip connection body. Thus, attachment of the welding tip is completed.

Preferably, the welding tip replacement apparatus according to any of the above aspects of the present invention includes a cutting mechanism that cuts a wire, extending through the welding tip and the tip connection body, between the tip connection body and the welding tip detached from the tip connection body.

In this welding tip replacement apparatus including the cutting mechanism, if the wire has melted and adhered to an end portion of the welding tip adjacent to the one end of the tip connection body to cause wire feed failure (hereinafter, such an abnormal condition will be referred to as "wire adhesion to the tip"), the welding tip with the melted wire is detached from the tip connection body, and the wire extending through the welding tip and the tip connection body is cut, so that the welding tip can be easily separated from the tip connection body.

In a related-art welding tip replacement apparatus for a welding torch in which a welding tip is detachably engaged with a tip connection body in a screw threaded manner, if wire adhesion to the tip has occurred, a force for wrenching a wire off will be needed upon detachment of the welding tip. It is therefore very difficult to detach the welding tip. The welding tip replacement apparatus according to the present invention can solve such a problem.

Preferably, the welding tip replacement apparatus according to any of the aspects of the present invention further includes a rotating mechanism that rotates the welding tip, which has to be replaced, about the axis by a predetermined angle, the rotating mechanism being positioned next to the welding tip.

In this welding tip replacement apparatus including the rotating mechanism, the welding tip which has to be replaced is rotated about the axis by a predetermined angle during an interval between welding operations, so that a point of friction between the welding tip and the wire is changed. Accordingly, various problems, such as displacement of a welding position, poor current supply to the wire, and wire adhesion to the tip, can be prevented without replacement of the welding tip. This results in a reduction in the number of times of replacing the welding tip.

Some of related-art welding tip replacement apparatuses include a rotator for attaching and detaching a welding tip. In order to separate screw-threaded portions which are firmly engaged with each other so that they are not separated from each other by friction force during welding operation, the rotator requires a mechanism for generating a large torque, e.g., a powerful motor. During attachment of a welding tip by the rotator included in the related-art welding tip replacement apparatus, the rotator may be damaged due to too large torque, or threads of the engaged portions may be damaged by slight deviation of an angle of rotation of the welting tip. It is therefore very difficult to control the rotator.

Whereas, the rotating mechanism according to the present invention is intended to change a point of friction between the welding tip and the wire and does not have to rotate the welding tip a plurality of times like the rotator included in the related-art welding tip replacement apparatus. It is only required that the rotating mechanism is rotated by a predetermined angle (for example, 180 degrees). In addition, since the welding torch according to the present invention is designed such that the welding tip is fastened axially and the welding tip is rotatable about the axis (because the components of the welding torch have structures which will be described later), large friction force does not occur during rotation of the welding tip. It is therefore only required that the rotating mechanism according to the present invention includes a mechanism for generating a small torque, e.g., a small motor. Furthermore, in the rotating mechanism according to the present invention, it is unnecessary to precisely control force during rotation of the welding tip, but it is only required that the amount of rotation (rotation angle) is controlled. The rotating mechanism can therefore be very easily controlled.

The rotating mechanism included in the welding tip replacement apparatus according to the present invention has a more simple structure than the rotator included in the related-art welding tip replacement apparatus.

Preferably, the welding tip replacement apparatus according to any of the aspects of the present invention includes at least two position sensors that acquire information about the position of the welding torch in at least two directions orthogonal to the axis.

In this welding tip replacement apparatus including at least two position sensors, information about the position of the welding torch in a plane orthogonal to the axis can be acquired. Accordingly, the welding torch can be accurately moved or positioned on the basis of the position information.

Preferably, the welding tip replacement apparatus according to any of the aspects of the present invention is configured to replace the welding tip with the other welding tip using a pallet. The apparatus may place the welding tip attached to the tip connection body onto the pallet and attach the other welding tip placed on the pallet to the tip connection body.

This welding tip replacement apparatus can place the welding tip, which has to be replaced, onto the pallet and attach another welding tip placed on the pallet to the tip connection body.

Another aspect of the present invention provides a welding tip replacement system including a welding torch, a robot arm that holds the welding torch, and the welding tip replacement apparatus according to any of the above aspects, the apparatus being configured to replace a welding tip in the welding torch with another welding tip.

In this welding tip replacement system, a predetermined structure of the welding torch enables the use of the welding tip replacement apparatus having a simple structure in which a rotator for replacing a welding tip and a mechanism for applying a large torque to the rotator are omitted.

Since the welding tip replacement system includes the robot arm, the welding torch can be appropriately detached and attached.

Another aspect of the present invention provides a method for replacing a welding tip for a welding torch that includes a tubular tip connection body, a tubular retaining member fitted over the tip connection body, a tubular welding tip fitted within the tip connection body, and an elastic member urging the retaining member along the axis of the tip connection body toward one end of the tip connection body, the welding torch being configured such that displacing the retaining member axially toward the other end of the tip connection body causes the welding tip axially fastened to the tip connection body to be released. The method includes the steps of detaching the welding tip from the tip connection body by displacing the retaining member axially toward the other end, and attaching another welding tip to the tip connection body by inserting the other welding tip into the tip connection body while displacing the retaining member axially toward the other end, and then displacing the retaining member axially toward the one end.

The detaching and attaching steps of the welding tip replacing method involve displacing the retaining member axially and displacing the welding tip (or the welding torch) axially. It is unnecessary to rotate the welding tip. The welding tip replacing method therefore enables welding tips to be easily detached and attached.

This welding tip replacing method allows the use of a welding tip replacement apparatus having the above-described simple structure in which a rotator for replacing a welding tip and a mechanism for applying a large torque to the rotator are omitted.

The welding tip replacement apparatus according to any of the aspects of the present invention does not require a rotator, which is essential to a related-art welding tip replacement apparatus, for replacement of a welding tip, and accordingly does not require a mechanism for applying a large torque to the rotator. According to the present invention, therefore, the welding tip replacement apparatus with a simple structure can be provided.

Furthermore, in the welding tip replacement apparatus according to any of the aspects of the present invention, it is unnecessary to apply external forces to the retaining member in directions other than the direction along the axis in order to detach or attach the welding tip. For example, while a cylindrical nozzle covering the outer curved surface of the retaining member remains attached to the welding torch, a welding tip can be detached or attached. The welding tip replacement apparatus according to any of the aspects of the present invention can therefore reduce the number of processing steps necessary for detachment and attachment of welding tips, thus reducing operation time.

BRIEF DESCRIPTION OF THE DRAWINGS

FIGS. 2A and 2B are longitudinal sectional views of the structure of the welding torch according to the embodiment of the present invention, FIG. 2A illustrating a state in which a retaining member is displaced in the distal direction, FIG. 2B illustrating a state in which the retaining member is displaced in the proximal direction;

FIGS. 3A to 3C are longitudinal sectional views of the structure of a welding tip replacement apparatus according to a first embodiment of the present invention, FIG. 3A illustrating a state before a welding tip is detached, FIG. 3B illustrating a state in which the retaining member is displaced in the proximal direction such that the welding tip is released, FIG. 3C illustrating a state in which the welding tip is detached away from the distal end of a tip connection body;

FIGS. 4A to 4C are longitudinal sectional views of the structure of the welding tip replacement apparatus according to the first embodiment of the present invention, FIG. 4A illustrating a state before a welding tip is attached, FIG. 4B illustrating a state in which the welding tip is attached, FIG. 4C illustrating a state in which the retaining member is displaced in the distal direction such that the welding tip is fastened;

FIGS. 5A and 5B are longitudinal sectional views of the welding tip replacement apparatus in which the welding tip has to be replaced because of wire adhesion to the tip, FIG. 5A illustrating a state before the welding tip is detached, FIG. 5B illustrating a state in which the welding tip is detached away from the distal end of the tip connection body;

FIG. 7 is a block diagram of a schematic configuration of a welding tip replacement system according to the first embodiment of the present invention;

FIG. 9 is a flowchart of a welding tip replacing operation performed by the welding tip replacement apparatus and a robot arm according to the first embodiment of the present invention;

FIGS. 10A to 10C are longitudinal sectional views of the structure of a welding tip replacement apparatus according to a second embodiment of the present invention, FIG. 10A illustrating a state before a welding tip is detached, FIG. 10B illustrating a state in which a retaining member is displaced in the proximal direction such that the welding tip is detached, FIG. 10C illustrating a state in which a welding torch is moved upward after detachment of the welding tip;

FIGS. 11A to 11D are longitudinal sectional views of the structure of the welding tip replacement apparatus according to the second embodiment of the present invention, FIG. 11A illustrating a state before a welding tip is attached, FIG. 11B illustrating a state in which the welding tip is attached, FIG. 11C illustrating a state in which the retaining member is displaced in the distal direction such that the welding tip is fastened, FIG. 11D illustrating a state in which the welding torch is moved upward after attachment of the welding tip;

DESCRIPTION OF THE PREFERRED EMBODIMENTS

Embodiments of the present invention will be described in detail below appropriately with reference to the drawings.

In the following description, terms "distal", "proximal", "up", and "down" are used with reference to the orientation of the figures.

Schematic Configuration of Welding Tip Replacement System

A welding tip replacement system X is configured to replace a welding tip 1 attached to a welding torch 10.

Figure 1:
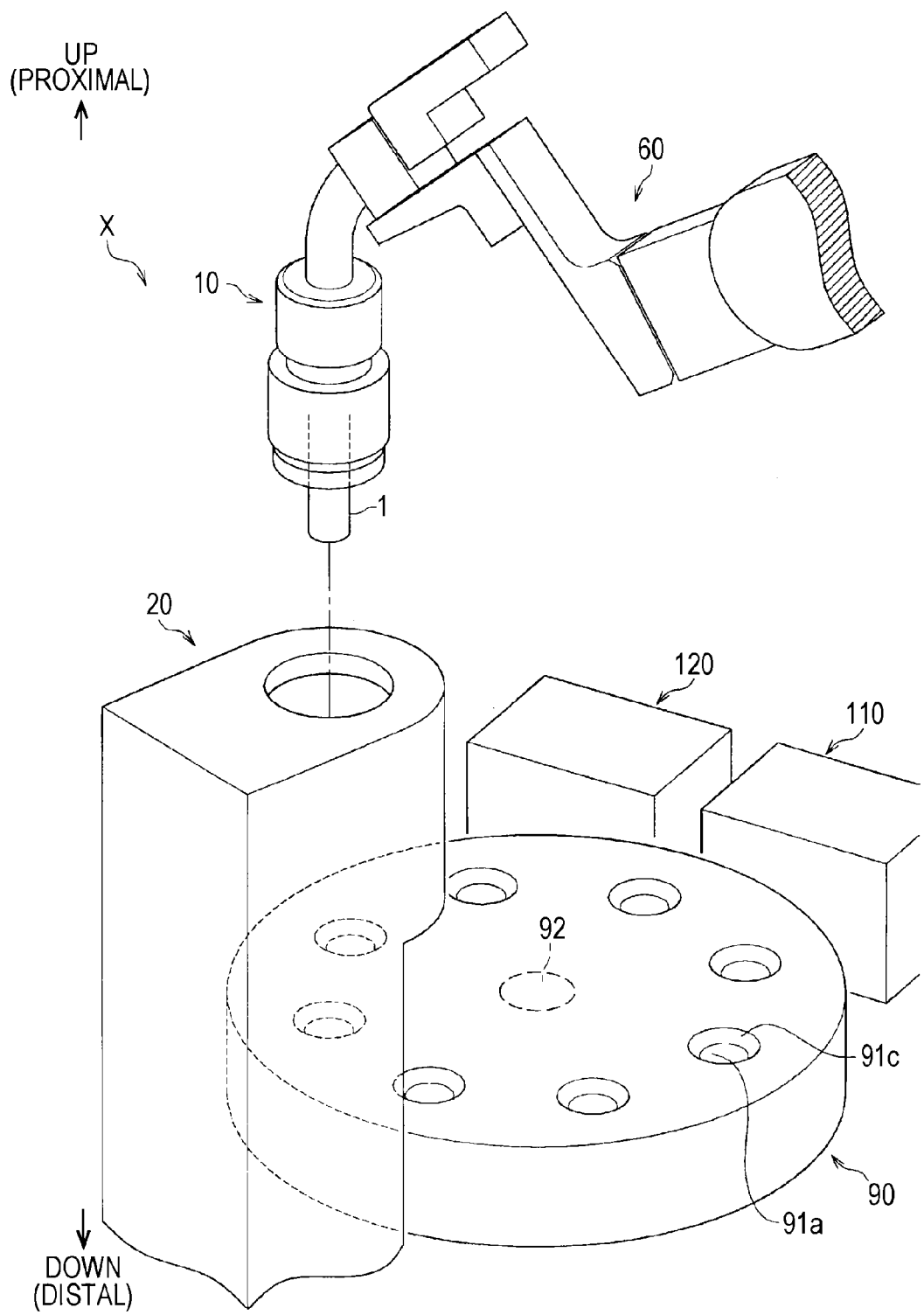
FIG. 1 is a schematic diagram of a welding tip replacement apparatus according to an embodiment of the present invention to which a welding torch is to be inserted by a robot arm.

Referring to FIG. 1, the welding tip replacement system X according to a first embodiment of the present invention includes the welding torch 10 extending in an up-down direction, a robot arm 60 holding the welding torch 10 from above, and a welding tip replacement apparatus 20 positioned under the welding torch 10, the apparatus 20 being capable of receiving the welding torch 10. The components, such as the welding tip replacement apparatus 20 and the robot arm 60, of the welding tip replacement system X are driven in a controlled manner by a controller 70 (refer to FIG. 7).

The components of the welding tip replacement system X will be described below.

Welding Torch

The welding torch 10 has a proximal end connected to the robot arm 60 and is configured to continuously feed a wire W, fed from a wire feeder 130, through the distal end of the welding tip 1 to an arc generation region on the surface of a base material serving as a portion to be welded.

Referring to FIGS. 2A and 2B, the welding torch 10 is substantially symmetrical with respect to the center axis O (hereinafter, appropriately referred to as the "O axis"). The welding torch 10 includes a tip connection body 3, a retaining member 4, and a welding tip 1. The retaining member 4 is supported by an elastic member 5 such that the retaining member 4 is placed so as to surround the outer curved surface of the tip connection body 3. The welding tip 1 is detachably fitted within the tip connection body 3 while being fastened by fastening members 2. The welding torch 10 further includes a shielding member 6 on the outer curved surface of a distal end portion of the tip connection body 3.

The components of the welding torch 10 may comprise a high-conductivity material, such as copper, copper alloy (e.g., brass), silver, or silver alloy, so as to conduct welding current.

Welding Tip

The welding tip 1 is a member that supplies current to the wire W extending through the welding tip 1 and appropriately guides the wire W to the arc generation region.

The welding tip 1 is tubular such that the linear wire W can extend therethrough. The welding tip 1 has a fastening groove 1a extending circumferentially on the outer curved surface thereof. The fastening groove 1a is positioned so as to face fastening holes 3a, which will be described later, when the welding tip 1 is fitted within the tip connection body 3 (FIG. 2A). In other words, the fastening groove 1a is positioned inside the fastening holes 3a in the vertical direction along the O axis.

The shape of the outer curved surface of the welding tip 1 is not particularly limited, except for the formation of the fastening groove 1a. The welding tip 1 may be shaped like a cylinder as illustrated in FIGS. 2A and 2B, or may be shaped like a bullet such that the outside diameter of the distal end portion of the tip decreases in the distal direction. The entire size and length of the welding tip 1 are also not particularly limited.

Tip Connection Body

The tip connection body 3 has a proximal end connected through a connecting member 7 or directly to the robot arm 60 and a distal end detachably connected to the welding tip 1, such that the tip connection body 3 detachably couples the robot arm 60 and the welding tip 1.

The tip connection body 3 is generally tubular such that the welding tip 1 can be fitted therein, and has the fastening holes 3a on the outer curved surface such that each fastening member 2 can be fitted in the corresponding hole. The outer curved surface of the tip connection body 3 is stepped such that the outside diameter increases in the proximal direction. The tip connection body 3 has a first shoulder 3b in contact with the proximal end of the elastic member 5 and a second shoulder 3c to be in contact with the proximal end of the retaining member 4.

The fastening holes 3a, whose number is four, are circumferentially spaced at equal distances. The tip connection body 3 with such a structure holds the welding tip 1 in four directions so as to stably fasten the welding tip 1 along the O axis.

Each of the fastening holes 3a is tapered such that the fastening member 2 does not fall into the inside of the tip connection body 3. Specifically, the diameter of each fastening hole 3a decreases inwardly toward the O axis and the diameter thereof on the inner curved surface of the tip connection body 3 is smaller than the width of the fastening member 2.

A proximal portion of the tip connection body 3 is connected to the connecting member 7 having an inside diameter smaller than that of the tip connection body 3. Accordingly, the proximal end of the welding tip 1 is in contact with the distal end of the connecting member 7 while the welding tip 1 is fitted within the tip connection body 3, so that the welding tip 1 can be positioned along the O axis.

Although the tip connection body 3 and the connecting member 7 are illustrated as individual components in FIGS. 2A and 2B, they may be integrated with each other into a single component.

Fastening Members

The fastening members 2 are configured to fasten the welding tip 1 to the tip connection body 3 along the O axis. Each fastening member 2 is spherical. Since the fastening member 2 is spherical, the fastening member 2 is rotatable and is in point contact with the fastening groove 1a of the welding tip 1 instead of in line contact therewith. Thus, the welding tip 1 can be fastened rotatably about the O axis.

The fastening member 2 is shaped such that the width, indicated at L, of the fastening member 2 along the diameter of the tip connection body 3 is larger than the distance, indicated at $L_1$, between the inner curved surface of a small diameter portion 4a of the retaining member 4 and the outer curved surface of the welding tip 1, namely, $L>L_1$. With such a structure, while part of the fastening member 2 is in contact with the inner curved surface of the small diameter portion 4a of the retaining member 4 (FIG. 2A), the opposite part of the fastening member 2 from the contact part is fitted in the fastening groove 1a of the welding tip 1 such that it extends through the fastening hole 3a of the tip connection body 3. Thus, the welding tip 1 is fastened to the tip connection body 3 along the O axis.

Furthermore, the fastening member 2 is shaped such that the width L along the diameter of the tip connection body 3 is smaller than or equal to the distance, indicated at $L_2$, between the inner curved surface of the small diameter portion 4a of the retaining member 4 and the bottom surface of the fastening groove 1a, namely, $L \leq L_2$. With such a structure, while part of the fastening member 2 is in contact with the inner curved surface of the small diameter portion 4a of the retaining member 4 (FIG. 2A), the opposite part of the fastening member 2 from the contact part is fitted in the fastening groove 1a of the welding tip 1 without pressing against the bottom surface of the fastening groove 1a. Thus, the welding tip 1 is fastened along the O axis such that it is rotatable about the O axis.

In addition, the fastening member 2 is shaped such that the width L along the diameter of the tip connection body 3 is smaller than or equal to the distance, indicated at $L_3$, between the inner curved surface of a large diameter portion 4b of the retaining member 4 and the outer curved surface of the welding tip 1, namely, $L \le L_3$. With such a structure, while part of the fastening member 2 is in contact with the inner curved surface of the large diameter portion 4b of the retaining member 4 (FIG. 2B), the opposite part of the fastening member 2 from the contact part is not fitted in the fastening groove 1a of the welding tip 1. Accordingly, the welding tip 1 can be detached from the tip connection body 3 along the O axis.

Furthermore, the fastening member 2 is shaped such that the width L along the diameter of the tip connection body 3 is larger than the distance, indicated at $L_4$, between the inner curved surface of the large diameter portion 4b of the retaining member 4 and the outer curved surface of the tip connection body 3, namely, $L > L_4$. With such a structure, while part of the fastening member 2 is in contact with the inner curved surface of the large diameter portion 4b of the retaining member 4 (FIG. 2B), the opposite part of the fastening member 2 from the contact part is fitted in the corresponding fastening hole 3a of the tip connection body 3. Accordingly, the fastening member 2 is held along the O axis by the fastening hole 3a of the tip connection body 3 such that the fastening member 2 can be prevented from moving along the O axis.

The fastening member 2 is positioned so as to face the corresponding fastening hole 3a of the tip connection body 3. In other words, the fastening member 2 is positioned outside the corresponding fastening hole 3a in the vertical direction along the O axis.

Retaining Member

The retaining member 4 is configured to retain the fastening member 2 in the vertical direction along the O axis.

The retaining member 4 is generally tubular such that the tip connection body 3 can be fitted therein, and has the large diameter portion 4b, serving as a distal portion, and the small diameter portion 4a closer to the proximal end thereof than the large diameter portion 4b.

The small diameter portion 4a and the large diameter portion 4b of the retaining member 4 are shaped such that while the retaining member 4 is displaced in the distal direction (FIG. 2A), part of each fastening member 2 is in contact with the inner curved surface of the small diameter portion 4a, and while the retaining member 4 is displaced in the proximal direction (FIG. 2B), part of the fastening member 2 is in contact with the inner curved surface of the large diameter portion 4b.

While the retaining member 4 is displaced in the proximal direction (FIG. 2B), the proximal end of the retaining member 4 is in contact with the second shoulder 3c of the tip connection body 3. With such a structure, the termination of displacement of the retaining member 4 in the proximal direction is determined.

Furthermore, while the retaining member 4 is displaced in the distal direction (FIG. 2A), the small diameter portion 4a of the retaining member 4 is in contact with the shielding member 6. With such a structure, the termination of displacement of the retaining member 4 in the distal direction is determined.

Elastic Member

The elastic member 5 is configured to urge the retaining member 4 in the distal direction and support the retaining member 4 movably relative to the tip connection body 3 along the O axis. A spring is used as the elastic member 5.

The elastic member 5 is disposed between the tip connection body 3 and the retaining member 4 such that the distal end of the elastic member 5 is in contact with the small diameter portion 4a of the retaining member 4 and the proximal end thereof is in contact with the first shoulder 3b of the tip connection body 3.

While the elastic member 5 is stretched (FIG. 2A), part of each fastening member 2 is in contact with the inner curved surface of the small diameter portion 4a of the retaining member 4. While the elastic member 5 is compressed (FIG. 2B), part of each fastening member 2 is in contact with the inner curved surface of the large diameter portion 4b of the retaining member 4.

Shielding Member

The shielding member 6 is configured to prevent foreign matter, such as spatter, from entering the gap between the tip connection body 3 and the retaining member 4.

The shielding member 6 is generally circular such that it extends outwardly relative to the O axis beyond the inner curved surface of the large diameter portion 4b of the retaining member 4. The shielding member 6 is attached to the outer curved surface of the distal part of the tip connection body 3.

Since the shielding member 6 is provided, a distal surface 6a of the shielding member 6 prevents foreign matter, such as spatter, from entering the gap between the tip connection body 3 and the retaining member 4.

Welding Tip Replacement Apparatus (First Embodiment)

The welding tip replacement apparatus 20 according to the first embodiment is configured to detach the welding tip 1, which has to be replaced, from the welding torch 10 and attach another welding tip 11 (hereinafter, appropriately referred to as a "new welding tip 11") placed on a pallet.

Referring to FIG. 3A, the welding tip replacement apparatus 20 according to the first embodiment includes a first grasping mechanism 21 for grasping the retaining member 4 of the welding torch 10, a second grasping mechanism 23, located under the first grasping mechanism 21, for grasping the welding tip 1, a first driving mechanism 22, coupled to the first grasping mechanism 21, for moving the first grasping mechanism 21 in up and down directions, and a second driving mechanism 24, coupled to the second grasping mechanism 23, for moving the second grasping mechanism 23 in the up and down directions.

The welding tip replacement apparatus 20 further includes a cutting mechanism 40 for cutting the wire W and two position sensors 80 for acquiring information about the position of the welding torch 10 in two directions orthogonal to the up-down direction. The cutting mechanism 40 and the two position sensors 80 are arranged vertically between the first grasping mechanism 21 and the second grasping mechanism 23.

The welding tip replacement apparatus 20 drives the mechanisms on the basis of various signals, output from replacement apparatus control means 71a which will be described later, supplied from the controller 70 to an input-output unit 29 (refer to FIG. 7).

First and Second Grasping Mechanisms

The first grasping mechanism 21 is configured to grasp the retaining member 4, serving as a target object to be grasped, of the welding torch 10 and the second grasping mechanism 23 is configured to grasp the welding tip 1, serving as a target object to be grasped.

Referring to FIG. 3A, the first grasping mechanism 21 includes a first ring member 21a, four first grasping members 21b, and a first coupling member 21c. The first ring member 21a is ring-shaped such that it has an inside diameter larger than the outside diameter of the retaining member 4 of the welding torch 10. The first grasping members 21b extend from the first ring member 21a inwardly toward the outer curved surface of the retaining member 4. The first coupling member 21c couples the first ring member 21a to the first driving mechanism 22, which will be described later.

When receiving a grasp signal, output from the replacement apparatus control means 71a which will be described later, from the controller 70, the first grasping mechanism 21 permits the four first grasping members 21b to extend until they come into contact with the outer curved surface of the retaining member 4. When receiving a release signal, the first grasping mechanism 21 permits the four first grasping members 21b to retract toward the first ring member 21a such that the first grasping members 21b are not in contact with the outer curved surface of the retaining member 4. In other words, the first grasping mechanism 21 is capable of grasping and releasing the retaining member 4.

Figure 6A:
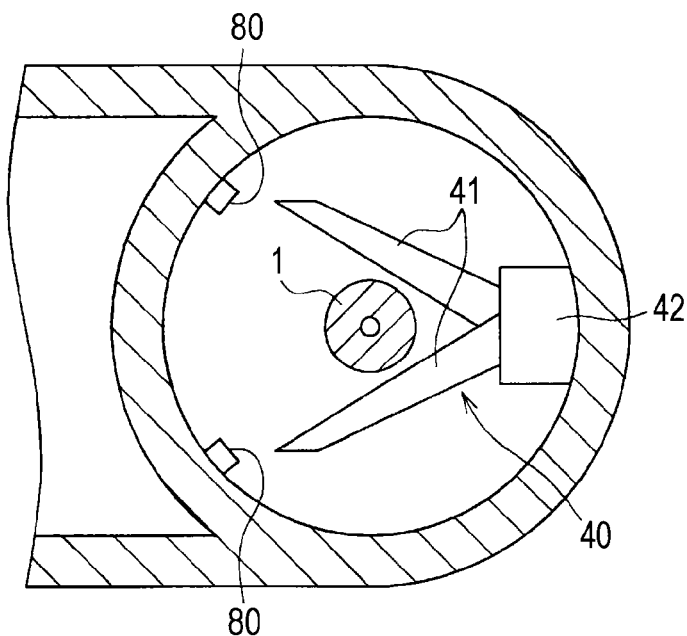
FIG. 6A is a cross-sectional view taken along the line VIA-VIA in FIG. 3B.
Figure 6B:
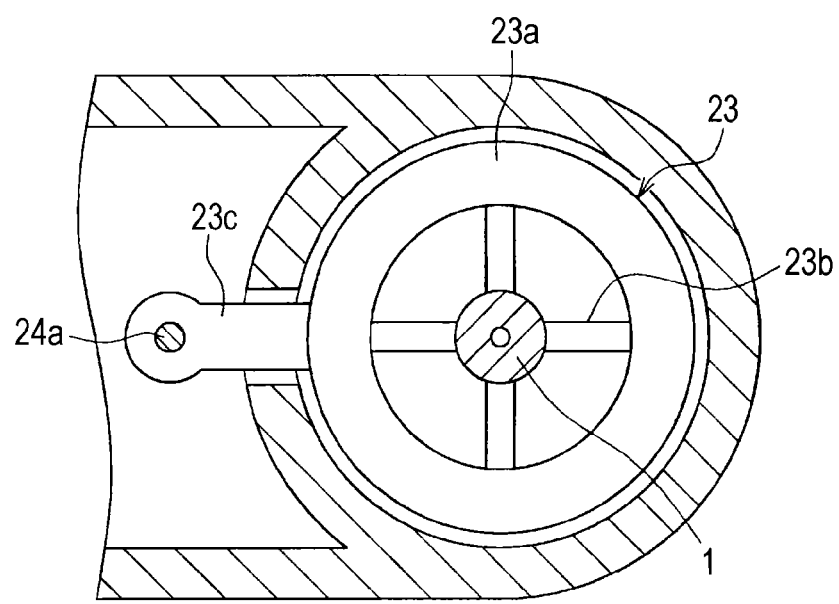
FIG. 6B is a cross-sectional view taken along the line VIB-VIB in FIG. 3B.

Referring to FIGS. 3A and 6B, the second grasping mechanism 23 includes a second ring member 23a, four second grasping members 23b, and a second coupling member 23c. The second ring member 23a is ring-shaped such that it has an inside diameter larger than the outside diameter of the welding tip 1. The second grasping members 23b extend from the second ring member 23a toward the outer curved surface of the welding tip 1. The second coupling member 23c couples the second ring member 23a to the second driving mechanism 24, which will be described later. The second grasping mechanism 23 is positioned under the first grasping mechanism 21.

The second grasping mechanism 23 is capable of grasping and releasing the welding tip 1 under the control of the replacement apparatus control means 71a in a manner similar to the first grasping mechanism 21.

A material for the first grasping mechanism 21 and the second grasping mechanism 23 is not particularly limited. Preferably, a free end portion of each of the first grasping members 21b and the second grasping members 23b is made of an elastic material, such as rubber, so as to be suitable for grasping. Alternatively, an elastic material, such as rubber, may be bonded to the free end of each of the first grasping members 21b and the second grasping members 23b.

A driving mechanism for permitting the first grasping members 21b and the second grasping members 23b to enter a grasping mode or a releasing mode is not particularly limited. Each of the first ring member 21a and the second ring member 23a may include a hydraulic driving mechanism or a pneumatic driving mechanism.

First and Second Driving Mechanisms

The first driving mechanism 22 is configured to drive the first grasping mechanism 21 along the axis of the tip connection body 3 (in the up and down directions). The second driving mechanism 24 is configured to drive the second grasping mechanism 23 along the axis of the tip connection body 3 (in the up and down directions).

Referring to FIG. 3A, the first driving mechanism 22 includes a rod-shaped first shaft 22a which the first coupling member 21c of the first grasping mechanism 21 is coupled to and a first lifting and lowering device 22b which drives the first shaft 22a in the up and down directions.

When the first driving mechanism 22 receives a lifting signal, output from the replacement apparatus control means 71a, from the controller 70, the first lifting and lowering device 22b permits the first grasping mechanism 21, coupled to the first shaft 22a, to move upward. When the first driving mechanism 22 receives a lowering signal, the first lifting and lowering device 22b permits the first grasping mechanism 21, coupled to the first shaft 22a, to move downward.

Referring to FIG. 3A, the second driving mechanism 24 includes a rod-shaped second shaft 24a which the second coupling member 23c of the second grasping mechanism 23 is coupled to and a second lifting and lowering device 24b which drives the second shaft 24a in the up and down directions. The second driving mechanism 24 is capable of lifting and lowering the second grasping mechanism 23 coupled to the second shaft 24a under the control of the replacement apparatus control means 71a in a manner similar to the first driving mechanism 22.

Each of the first lifting and lowering device 22b and the second lifting and lowering device 24b may be any device capable of driving the corresponding one of the first shaft 22a and the second shaft 24a in the up and down directions. Each of them may be a hydraulic device or a pneumatic device. Furthermore, the first lifting and lowering device 22b and the second lifting and lowering device 24b may constitute a single lifting and lowering device.

Cutting Mechanism

The cutting mechanism 40 is configured to, in the case where the wire W has melted and adhered to a distal end portion of the welding tip 1 (refer to FIG. 5A), move the welding tip 1 with the melted wire W downward and cut the wire W between the welding tip 1 and the tip connection body 3.

Referring to FIG. 6A, the cutting mechanism 40 includes two blades 41 and a cutting driver 42 which drives the two blades 41 such that the blades enter an opened state (non-cutting state) or a closed state (cutting state). The cutting mechanism 40 is positioned under the first grasping mechanism 21 and is located above the second grasping mechanism 23.

When the cutting mechanism 40 receives a cutting signal, output from the replacement apparatus control means 71a which will be described later, from the controller 70, the cutting driver 42 drives the two blades 41 in the opened state such that the blades 41 enter the closed state and then return to the opened state.

The cutting driver 42 of the cutting mechanism 40 may be a hydraulic device or a pneumatic device.

Position Sensors

The position sensors 80 are configured to acquire information about the position of the welding torch 10.

Referring to FIG. 6A, two or more position sensors 80 are arranged because it is necessary to acquire information about the position of the welding torch 10 in a plane orthogonal to the axis of the tip connection body 3 (the up-down direction). The position sensors 80 are arranged under the first grasping mechanism 21 and are positioned above the second grasping mechanism 23.

When receiving an acquisition signal, output from the replacement apparatus control means 71a, from the controller 70, the position sensors 80 acquire information about the position of the welding torch 10.

A known distance measuring sensor may be used as each of the position sensors 80.

Robot Arm

The robot arm 60 is a device which has a distal end to be connected to the welding torch 10 and is driven so as to move the welding torch 10 to a desired position.

When receiving a driving signal, output from arm control means 71b which will be described later, from the controller 70, the robot arm 60 is driven in accordance with the driving signal.

Pallet

Referring to FIG. 1, the pallet 90 is generally disk-shaped and has a shaft 92 at its center. The pallet 90 further has a plurality of cylindrical recesses 91a, each having an inside diameter equal to (or slightly larger than) the outside diameter of the welding tip 1, on its upper surface such that the recesses are equally spaced at a predetermined distance from the center of the shaft 92.

Referring to FIG. 3A, each recess 91a has a tapered surface 91c whose inside diameter increases upward. The recess 91a further has a clearance 91b for the wire W melted and adhered to the distal end portion of the welding tip 1 such that the clearance 91b is positioned so as to downwardly extend from the bottom surface of the recess 91a.

Controller

The controller 70 is a device for controlling driving of the welding tip replacement apparatus 20, the robot arm 60, and the like and includes a central processing unit (CPU), a read only memory (ROM), a random access memory (RAM), a hard disk drive (HDD), and an input-output interface.

Referring to FIG. 7, the controller 70 includes a control unit 71, a determining unit 72, a memory unit 73, and an input-output unit 74. The control unit 71 includes the replacement apparatus control means 71a, the arm control means 71b, wire feed control means 71c, pallet control means 71d, cutter control means 71e, and cleaning control means 71f.

The input-output unit 74 is configured to output signals supplied from the control unit 71 to the devices and output signals supplied from the devices to the determining unit 72 and the memory unit 73.

The input-output unit 74 includes a predetermined input interface and a predetermined output interface.

The input-output unit 74 outputs signals supplied from the control unit 71 to the welding tip replacement apparatus 20, the robot arm 60, the pallet 90, a wire end cutter 110, a torch cleaning and nozzle replacement device 120, and the wire feeder 130. Furthermore, the input-output unit 74 receives a feed failure signal from the wire feeder 130, a signal indicating a welding situation (the number of welding times or weld time) from the robot arm 60 (or the wire feeder 130), and signals indicating the position of the welding torch 10 from the position sensors 80, and outputs the signals to the determining unit 72 or the memory unit 73.

For convenience of explanation, the single unit functioning as an input unit and an output unit is illustrated in FIG. 7, while the individual units may be arranged.

The memory unit 73 is configured to store data supplied from the input-output unit 74 and data supplied from an external device.

The memory unit 73 stores, for example, the signal indicating a welding situation (the number of welding times or weld time) from the robot arm 60 (or the wire feeder 130), data indicating a sequence of driving the devices (progress schedule), an upper limit of the number of welding times of the welding tip 1, or an upper limit of weld time. Data can be input to the memory unit 73 through input means (not illustrated), such as a keyboard.

The determining unit 72 is configured to determine data supplied from the input-output unit 74 on the basis of data stored in the memory unit 73.

In the case where a signal indicating that it is impossible to feed the wire W is supplied from the wire feeder 130 during predetermined weld time previously set in the memory unit 73 (step S2 in FIG. 8), the determining unit 72 determines that a problem, for example, wire adhesion to the tip, has occurred, and outputs a signal to the control unit 71 so that the devices are driven in predetermined manners on the basis of the progress schedule stored in the memory unit 73. Furthermore, in the case where a signal indicating completion of welding is supplied from the robot arm 60 (or the wire feeder 130) (step S3 in FIG. 8), the determining unit 72 compares the number of times or total weld time using the welding tip 1 connected to the tip connection body 3 with the upper limit of the number of welding times or the upper limit of the weld time stored in the memory unit 73, thus determining whether the welding tip 1 has to be replaced. Then, the determining unit 72 outputs a signal to the control unit 71 so that the devices are driven in accordance with the result of determination on the basis of the progress schedule stored in the memory unit 73.

Furthermore, in the case where a signal indicating that the wire cannot be retracted is supplied from the wire feeder 130 (step S8 in FIG. 8), the determining unit 72 determines that the wire W has melted and adhered to the distal end of the welding tip 1 at the end of welding, and inputs a signal to the control unit 71 so that the devices are driven in predetermined manners on the basis of the progress schedule stored in the memory unit 73.

The control unit 71 is configured to output signals for controlling driving of the devices on the basis of a signal supplied from the determining unit 72.

The replacement apparatus control means 71a outputs signals for control of the welding tip replacement apparatus 20, specifically, control of grasping and releasing by the first grasping mechanism 21 and the second grasping mechanism 23, control of lifting and lowering by the first driving mechanism 22 and the second driving mechanism 24, control of the opened state (non-cutting state) and the closed state (cutting state) of the cutting mechanism 40, and control of acquisition of position information from the position sensors 80.

The arm control means 71b is configured to output a signal for controlling driving of the robot arm 60.

The wire feed control means 71c is configured to output a signal for controlling the feed of the wire W from the wire feeder 130, which will be described later.

The pallet control means 71d is configured to output a signal for controlling the rotation of the pallet 90 (by a predetermined angle).

The cutter control means 71e is configured to output a signal for controlling cutting by the wire end cutter 110, which will be described later.

The cleaning control means 71f is configured to output a signal for controlling cleaning of the welding torch 10 by the torch cleaning and nozzle replacement device 120 and replacement of a nozzle 140.

While the configurations of the units and means included in the controller 70 have been described above, processing steps or processes (detaching and attaching processes) of a welding tip replacing method controlled by the controller 70 will be described in detail later.

Other Components

The wire end cutter 110 is configured to cut the free end of the wire W. Any known device may be used as the wire end cutter 110. The torch cleaning and nozzle replacement device 120 is configured to clean the welding torch 10 and detach and attach the nozzle 140 (refer to FIGS. 10A to 10C). Any known device may be used as the torch cleaning and nozzle replacement device 120. The wire feeder 130 is configured to feed the wire W to the welding torch 10. Any known device may be used as the wire feeder 130.

Welding Tip Replacing Method (Overall Flow)

Figure 8:
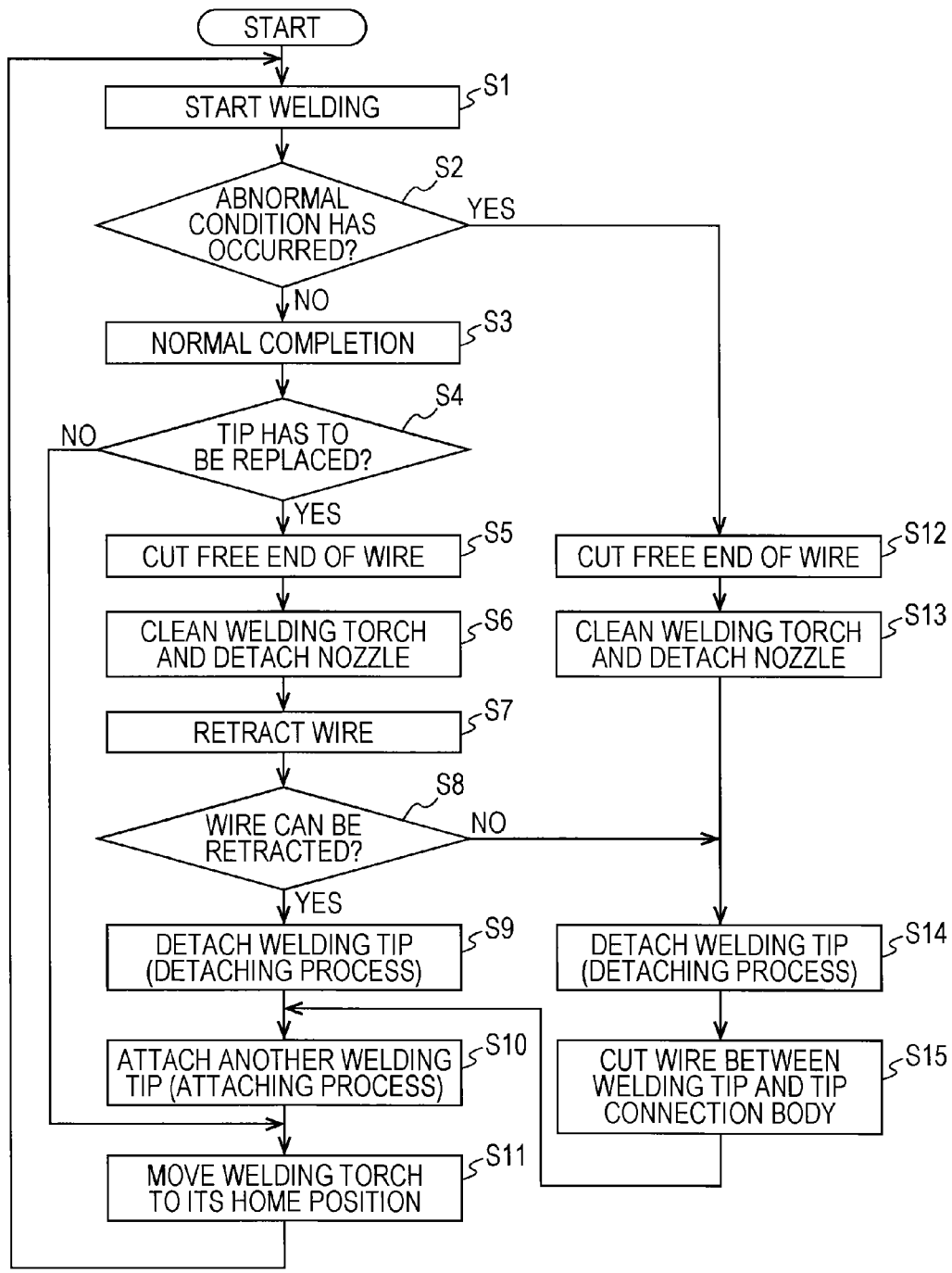
FIG. 8 is a flowchart of an operation of the welding tip replacement system according to an embodiment of the present invention.

The overall flow of the welding tip replacing method will be described with reference to FIG. 8.

The welding torch 10 starts welding (step S1). If any abnormal condition has not occurred during welding (NO in step S2), welding is completed normally (step S3). Whereas, if an abnormal condition (for example, wire adhesion to the tip) has occurred during welding (YES in step S2), the method proceeds to step S12.

In the case where welding is completed normally (step S3), whether the welding tip 1 has to be replaced is determined in step S4. In the case where the welding tip 1 does not have to be replaced (NO in step S4), the welding torch 10 is moved to its home position (step S11) and welding is again started (step S1).

Whereas, if the welding tip 1 has to be replaced (YES in step S4), the method proceeds to step S5.

As regards determination as to whether the welding tip 1 has to be replaced, the number of welding times or total weld time using the welding tip 1 connected to the tip connection body 3 is compared to the upper limit of the number of welding times or the upper limit of the weld time stored in the memory unit 73. If the number of welding times or the weld time is greater than or equal to the upper limit, it is determined that the welding tip 1 has to be replaced. If the number of welding times or the welding time is less than the upper limit, it is determined that the welding tip 1 does not have to be replaced. Furthermore, whether the welding tip 1 has to be replaced may be determined on the basis of, for example, the degree of wear or soiling of the welding tip 1 detected by a sensor.

The free end of the wire W is cut in step S5. Cutting is performed by the wire end cutter 110. Then, the method proceeds to step S6.

In step S6, the welding torch 10 is cleaned and the nozzle 140 is detached. The cleaning and detachment are performed by the torch cleaning and nozzle replacement device 120. After that, the method proceeds to step S7.

If any abnormal condition has occurred during welding (YES in step S2), the method proceeds to step S12 and then step S13. Steps S12 and S13 are similar to steps S5 and S6 described above.

In step S7, the wire is retracted (or drawn back) in order to prepare for detachment of the welding tip 1 and attachment of another tip. The wire retraction is performed by the wire feeder 130.

If the wire can be retracted (YES in step S8), the method proceeds to step S9. If the wire cannot be retracted (NO in step S8), the method proceeds to step S14.

The case where the wire cannot be retracted is, for example, a case where welding has been completed normally but the wire W has melted and adhered to the distal end portion of the welding tip 1 on completion of the welding.

In step S9, the welding tip 1 is detached (detaching process). After that, another welding tip 11 is attached in step S10 (attaching process).

In the case where the method proceeds to step S14 from step S13 or step S8, the welding tip 1 is detached in step S14 (detaching process), the wire W is cut between the welding tip 1 and the tip connection body 3 (step S15), and the other welding tip 11 is attached (step S10) (attaching process).

The detaching and attaching processes (steps S9 and S10 or steps S14, S15, and S10) will be described in detail later.

After step S10, the nozzle 140 is attached to the welding torch 10 (this operation is not illustrated). The nozzle attaching operation is performed by the torch cleaning and nozzle replacement device 120.

The welding torch 10 is moved to the home position (step S11) and, after that, welding is again started (step S1).

Detaching and Attaching Processes (First Embodiment)

The detaching and attaching processes of the welding tip replacing method will be described in detail with reference to FIG. 9 (and appropriately with reference to FIGS. 3A to 5B).

The welding torch 10 is inserted into the welding tip replacement apparatus 20 (step S21).

The first grasping mechanism 21 grasps the retaining member 4 and the second grasping mechanism 23 grasps the welding tip 1 (FIG. 3A).

The first grasping mechanism 21 displaces the retaining member 4 in the proximal direction (step S22, FIG. 3B). This displacement allows the fastening members 2 to release the fastened welding tip 1.

The second grasping mechanism 23 moves the welding tip 1 downward, detaches the welding tip 1, and places the tip onto the pallet (step S23, FIG. 3C).

Referring to FIGS. 5A and 5B, in the case where the wire W has melted and adhered to the distal end portion of the welding tip 1 (YES in step S2 and NO in step S8 in FIG. 8), detaching the welding tip 1 allows the wire W to extend through the welding tip 1 and the tip connection body 3. In this case, therefore, the wire W is cut between the welding tip 1 and the tip connection body 3 by the cutting mechanism 40 (step S15). In the case where the wire W has melted and adhered to the distal end portion of the welding tip 1, merely feeding the wire W in the distal direction enables the welding tip 1 to be displaced in the distal direction. Accordingly, the welding tip 1 may be detached by simple feed of the wire W in the distal direction. Alternatively, the welding tip 1 may be grasped and detached by the second grasping mechanism 23 while the wire W is being fed in the distal direction.

Furthermore, after cutting the wire W, wire retraction (not illustrated) may be performed so that the new welding tip 11 can be easily attached.

Then, the second grasping mechanism 23 moves to its home position as illustrated in FIG. 3A, for example (step S24), After that, the pallet 90 is rotated by the predetermined angle (step S25) such that the new welding tip 11 placed in the recess 91*a* of the pallet 90 is positioned under the welding tip replacement apparatus 20.

The second grasping mechanism 23 moves downward and grasps the new welding tip 11 (FIG. 4A). Then, the second grasping mechanism 23 moves the new welding tip 11 upward and attaches the tip to the tip connection body 3 (step S26, FIG. 4B).

The first grasping mechanism 21 displaces the retaining member 4 in the distal direction (step S27, FIG. 4C). Such a process allows the new welding tip 11 to be fastened to the tip connection body 3. Since the retaining member 4 is urged in the distal direction by the elastic member 5, releasing grasping of the retaining member 4 by the first grasping mechanism 21 also enables the retaining member 4 to be displaced in the distal direction.

A welding tip replacement apparatus, a welding tip replacement system, and a welding tip replacing method according to a second embodiment of the present invention will be described below.

Explanation of the same components or components having the same configurations as those in the first embodiment will be omitted.

Welding Tip Replacement Apparatus (Second Embodiment)

Referring to FIG. 10A, the welding tip replacement apparatus, indicated at 30, according to the second embodiment includes a pressing member 31 that protrudes from an insertion hole 100*d* of a pallet 100 and moves along the axis of the tip connection body (in up and down directions), and a pressing driving mechanism 33 that permits the pressing member 31 to move in the up and down directions.

The welding tip replacement apparatus 30 may include the cutting mechanism 40 for cutting the wire W and the two position sensors 80 for acquiring information about the position of the welding torch 10 in two directions orthogonal to the axis of the tip connection body 3 (in the up-down direction) such that the mechanism and the sensors are positioned above the pressing member 31.

Pressing Member

Referring to FIG. 10A, the pressing member 31 is a tubular member capable of pressing a distal end surface of the retaining member 4 of the welding torch 10 in the proximal direction. The pressing member 31 is configured such that a lower portion thereof is partially received in a tubular housing 32 positioned under the member.

Pressing Driving Mechanism

The pressing driving mechanism 33 is configured to drive the pressing member 31 along the axis of the member. Specifically, the pressing driving mechanism 33 can drive the pressing member 31 to any of three positions, i.e., a first position (FIGS. 10A to 10C) in which the pressing member 31 is positioned at the highest level, a second position (FIGS. 11A and 11B) in which the pressing member 31 is positioned at a level lower than the first position, and a third position (FIGS. 11C and 11D) in which the pressing member 31 is positioned at the lowest level.

The pressing driving mechanism 33 may be any mechanism capable of driving the pressing member 31 in the up and down directions, for example, a hydraulic mechanism or a pneumatic mechanism.

Controller (Second Embodiment)

Figure 12:
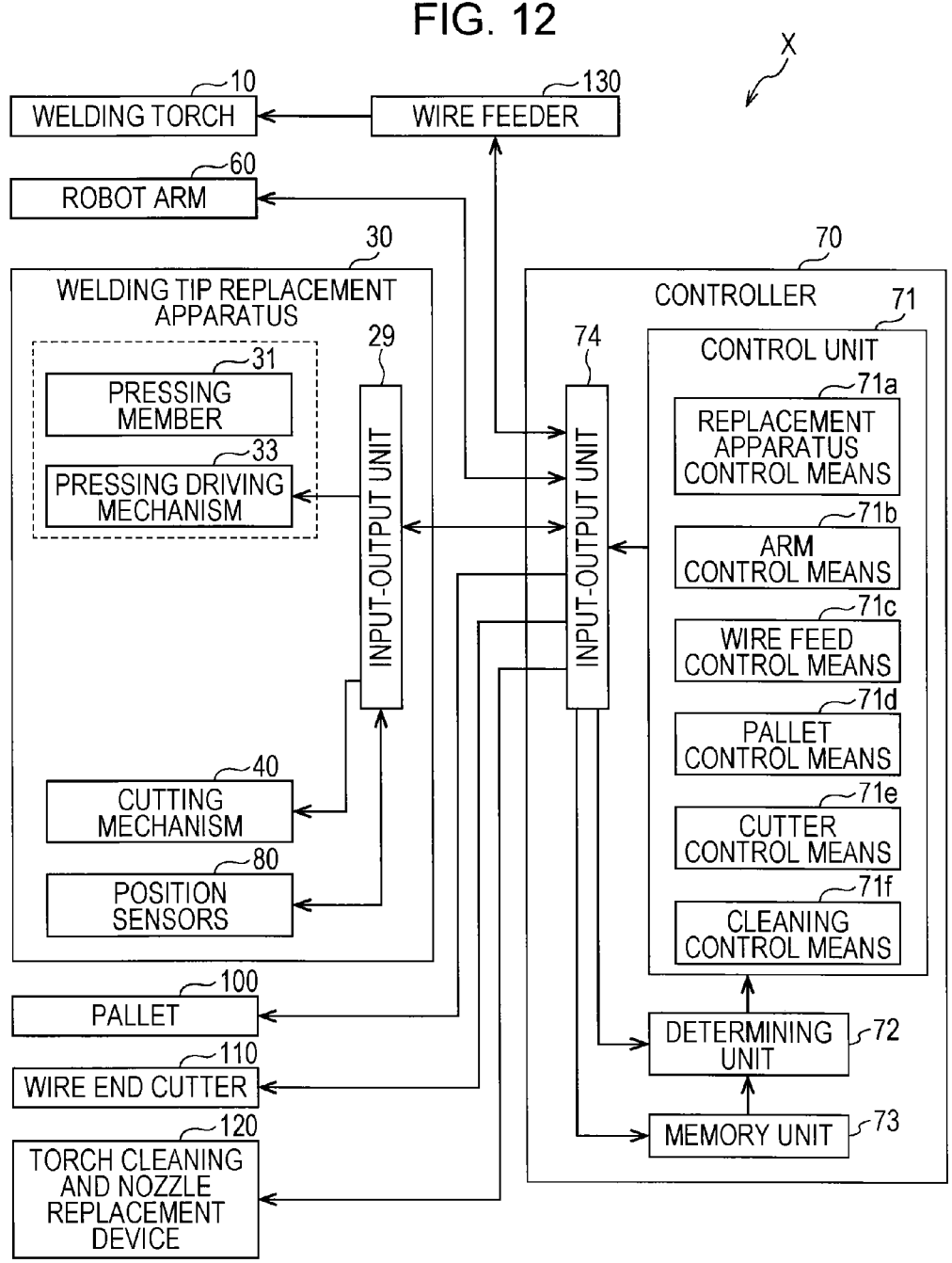
FIG. 12 is a block diagram of a schematic configuration of a welding tip replacement system according to the second embodiment of the present invention.

The controller 70 according to the second embodiment has a configuration similar to that of the controller 70 according to the first embodiment as illustrated in FIG. 12, except for data indicating a driving sequence (progress schedule) for the devices stored in the memory unit 73 and signals output from the replacement apparatus control means 71a.

The replacement apparatus control means 71a is configured to output a signal for controlling driving of the pressing member 31 along its axis, i.e., a signal indicating to which of the first position (FIGS. 10A to 10C) where the pressing member 31 is positioned in the highest level, the second position (FIGS. 11A and 11B) where the member is positioned lower than the first position, and the third position (FIGS. 11C and 11D) where the member is positioned at the lowest level the pressing driving mechanism 33 drives the pressing member 31.

Pallet

Referring to FIG. 10A, the pallet 100 used in the welding tip replacement apparatus 30 according to the second embodiment includes a pallet upper plate 100a, a side plate 100b, and a pallet lower plate 100c. The pallet upper plate 100a and the pallet lower plate 100c are disk-shaped and are arranged vertically. The side plate 100b is attached to the periphery of the pallet upper plate 100a and that of the pallet lower plate 100c. The pallet 100 has a plurality of insertion holes 100d in the pallet upper plate 100a, each hole having a diameter larger than the outside diameter of the nozzle 140 so that the welding torch 10 with the nozzle 140 can be inserted into the hole. The pallet 100 further includes a plurality of tip placement portions 101, each of which upwardly protrudes from the pallet lower plate 100c under the corresponding insertion hole 100d. Each tip placement portion 101 is generally cylindrical and has a cylindrical recess 101a at the center of the upper surface thereof, the recess having an inside diameter equal to (or slightly larger than) the outside diameter of the welding tip 1. The recess 101a has a tapered surface 101c such that the inside diameter of the tapered surface 101c increases upward. The tip placement portion 101 further has a clearance 101b for the wire W melted and adhered to the distal end portion of the welding tip 1 such that the clearance downwardly extends from the bottom surface of the recess 101a.

Other members in the welding tip replacement apparatus 30 according to the second embodiment are the same as those in the welding tip replacement apparatus 20 according to the first embodiment.

Detaching and Attaching Processes (Second Embodiment)

Figure 13:
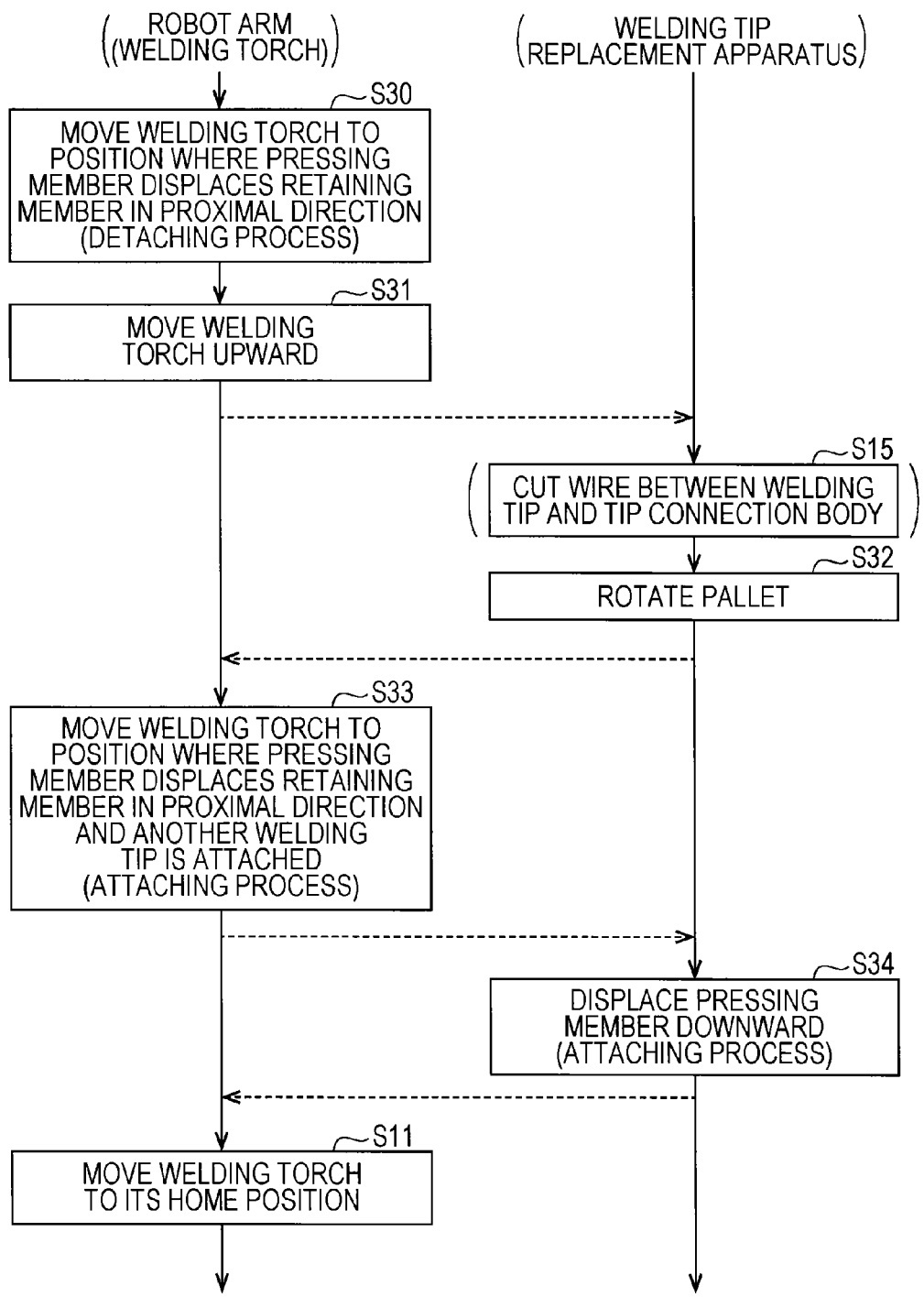
FIG. 13 is a flowchart of a welding tip replacing operation performed by the welding tip replacement apparatus according to the second embodiment of the present invention and a robot arm.

Detaching and attaching processes of the welding tip replacement method according to the second embodiment will be described in detail below with reference to FIG. 13 (appropriately with reference to FIGS. 10A to 11D).

The robot arm 60 moves the welding torch 10 to a position directly above the welding tip replacement apparatus 30 (FIG. 10A).

The robot arm 60 then moves the welding torch 10 such that the upper end of the pressing member 31 displaces the retaining member 4 in the proximal direction (step S30). This allows the fastening members 2 to release the welding tip 1. The welding tip 1 is accordingly inserted into the recess 101a of the pallet 100 positioned under the tip (FIG. 10B).

The robot arm 60 then moves the welding torch 10 upward (step S31, FIG. 10C).

In the case where the wire W has melted and adhered to the distal end portion of the welding tip 1 (YES in step S2 or NO in step S8 in FIG. 8), the detaching process allows the wire W to extend through the welding tip 1 and the tip connection body 3. In this case, therefore, the wire W is cut between the welding tip 1 and the tip connection body 3 by the cutting mechanism 40 (step S15). After cutting of the wire W, wire retraction (not illustrated) may be performed so that the new welding tip 11 can be easily attached.

The pallet 100 is rotated by a predetermined angle such that the new welding tip 11 placed in a recess 101a of another tip placement portion 101 is positioned under the welding torch 10 (step S32, FIG. 11A).

The robot arm 60 moves the welding torch 10 such that the upper end of another pressing member 31 displaces the retaining member 4 in the proximal direction and the new welding tip 11 is attached (the fastening members 2 are fitted in a fastening groove 11a of the new welding tip 11) (step S33, FIG. 11B).

The corresponding pressing mechanism 33 displaces the pressing member 31 downward (step S34, FIG. 11C). Such a process enables the new welding tip 11 to be fastened to the tip connection body 3.

After that, the robot arm 60 moves the welding torch 10 upward (FIG. 11D).

In the use of the welding tip replacement apparatus 30 according to the second embodiment, the welding tip 1 can be detached or attached while the cylindrical nozzle 140 is attached to the welding torch 10 so as to cover the outer curved surface of the retaining member 4. Advantageously, the nozzle detaching operation in step S6 and step S13 (refer to FIG. 8) can be omitted in the welding tip replacing method.

A rotating mechanism 50 and a welding tip replacing method using the rotating mechanism 50 will be described below.

Rotating Mechanism

Each of the welding tip replacement apparatuses 20 and 30 may further include the rotating mechanism 50.

The rotating mechanism 50 is configured to rotate the welding tip 1 about the axis of the tip by a predetermined angle. For example, the welding tip 1 is rotated about the axis by 90 degrees, 120 degrees, or 180 degrees.

Figure 14A:
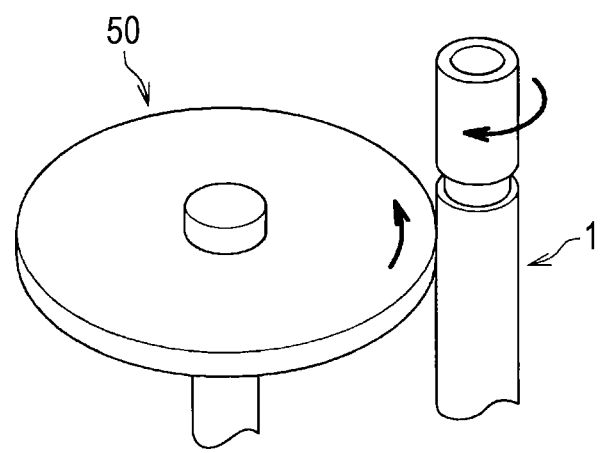
FIG. 14A is a perspective view of a rotating mechanism according to an embodiment of the present invention.
Figure 14B:
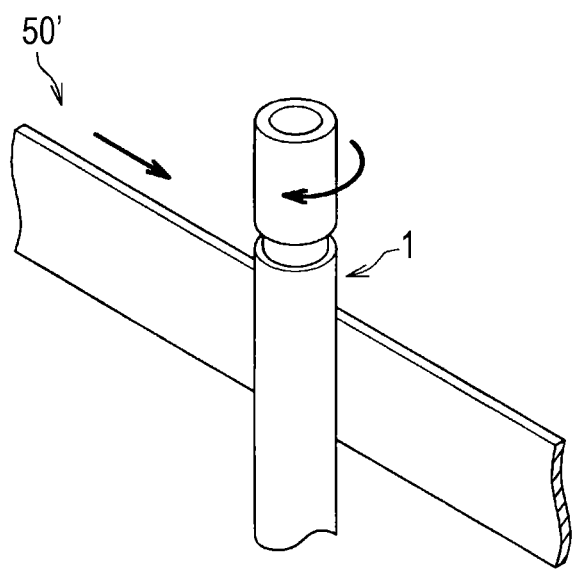
FIG. 14B is a perspective view of a rotating mechanism according to a modification.

Referring to FIG. 14A, the rotating mechanism 50 is disk-shaped and is configured to rotate while the rim is in contact with the outer curved surface of the welding tip 1. It is only required that the rotating mechanism 50 can rotate the welding tip 1. A rotating mechanism 50' may therefore be plate-shaped and be configured to move while one surface is in contact with the welding tip 1 as illustrated in FIG. 14B. The rotating mechanism 50 may be shaped in a sector instead of a disk as illustrated in FIG. 14A and be configured to rotate while the edge of an arcuate portion is in contact with the outer curved surface of the welding tip 1.

The rotating mechanism 50 may be placed in any position where the mechanism is next to the welding tip 1. The rotating mechanism 50 may be placed in a position where the mechanism is in contact with the outer curved surface of the welding tip 1, or may be moved to a position where the mechanism is in contact with the outer curved surface of the welding tip 1. For example, the rotating mechanism 50 may be positioned under the first grasping mechanism and is positioned above the second grasping mechanism in the welding tip replacement apparatus 20. Alternatively, the rotating mechanism 50 may be positioned above the pressing member 31 in the welding tip replacement apparatus 30. In the case were the rotating mechanism 50 is placed near the welding tip replacement apparatus 20 or 30 and the welding tip 1 is rotated, the welding torch 10 may be moved to a position near the rotating mechanism 50 by the robot arm 60.

Welding Tip Replacing Method Using Rotating Mechanism

The welding tip replacing method of the welding tip replacement apparatus 20 or 30 including the rotating mechanism 50 includes step S41 between step S4 and step S5 and further includes step S42 between step S41 and step S11.

In step S41, the number of rotation times of the welding tip 1 connected to the tip connection body 3 is compared to an upper limit n of the number of rotation times stored in the memory unit 73 of the controller 70. If the number of rotation times is greater than or equal to n, the method proceeds to step S5. If the number of rotation times is less than n, the method proceeds to step S42. Assuming that the rotating mechanism 50 rotates the welding tip 1 about the axis by 90 degrees, n indicates three times. Assuming that the rotating mechanism 50 rotates the welding tip 1 about the axis by 120 degrees, n indicates two times. Assuming that the rotating mechanism 50 rotates the welding tip 1 about the axis by 180 degrees, n indicates once.

When receiving a rotation driving signal, output from the replacement apparatus control means 71a, from the controller 70, the rotating mechanism 50 rotates the welding tip 1 about the axis.

In step S42, the welding tip 1 is rotated by a predetermined angle by the rotating mechanism 50. Then, the method proceeds to step S11.

The rotating mechanism 50 may rotate the welding tip 1 after the welding tip 1 is detached from the tip connection body 3 and is then placed in the recess 91a or 101a of the pallet 90 or 100. The welding torch 10 according to the present invention can be rotated about the axis while the welding tip 1 is fastened to the tip connection body 3. Accordingly, the welding tip 1 may be rotated by the rotating mechanism 50 without being detached from the tip connection body 3.

While the embodiments of the present invention have been described above, it is to be understood that the present invention is not limited to the embodiments and the following appropriate modifications can be made within the spirit of the invention.

Each of the first grasping mechanism 21 and the second grasping mechanism 23 may have any structure capable of grasping a target object. Any grasping structure may be used. For example, the mechanism may be configured to grasp a target object by holding the object in two directions so as to pinch it, or may be configured to grasp the object by suction.

While the tubular pressing member 31 has been described above, the pressing member 31 may have any structure capable of pressing the distal end portion of the retaining member 4 of the welding torch 10. For example, the pressing member 31 may be rod-shaped such that it extends in the up-down direction.

The pressing member 31, the housing 32, and the pressing driving mechanism 33 may be arranged under each of the insertion holes 100d of the pallet 100. A single pressing member 31, a single housing, and a single pressing driving mechanism 33 may be arranged. In this case, the pressing member 31, the housing 32, and the pressing driving mechanism 33 may be fixed such that these components do not follow the rotation of the pallet 100 when the pallet 100 is rotated. During rotation of the pallet 100, the pressing member 31 is displaced in the distal direction such that the member does not protrude from the insertion hole 100d of the pallet 100 in the proximal direction. The pallet 100 may be rotated such that the pressing member 31 is positioned under another insertion hole 100d.

Although rotation of the welding tip 1 by the rotating mechanism 50 has been described above, the welding tip 1 may be rotated by the robot arm 60 instead of the rotating mechanism 50.

Specifically, the welding torch 10 with the welding tip 1 which has to be replaced is inserted into the welding tip replacement apparatus 20 according to the first embodiment, and the welding tip 1 is grasped by the second grasping mechanism 23. While the welding tip 1 is grasped by the second grasping mechanism 23, the welding torch 10 excluding the welding tip 1 is rotated by a predetermined angle (e.g., 180 degrees) by the robot arm 60. Thus, the welding tip 1 is rotated by the predetermined angle relative to the welding torch 10.

Figure 15:
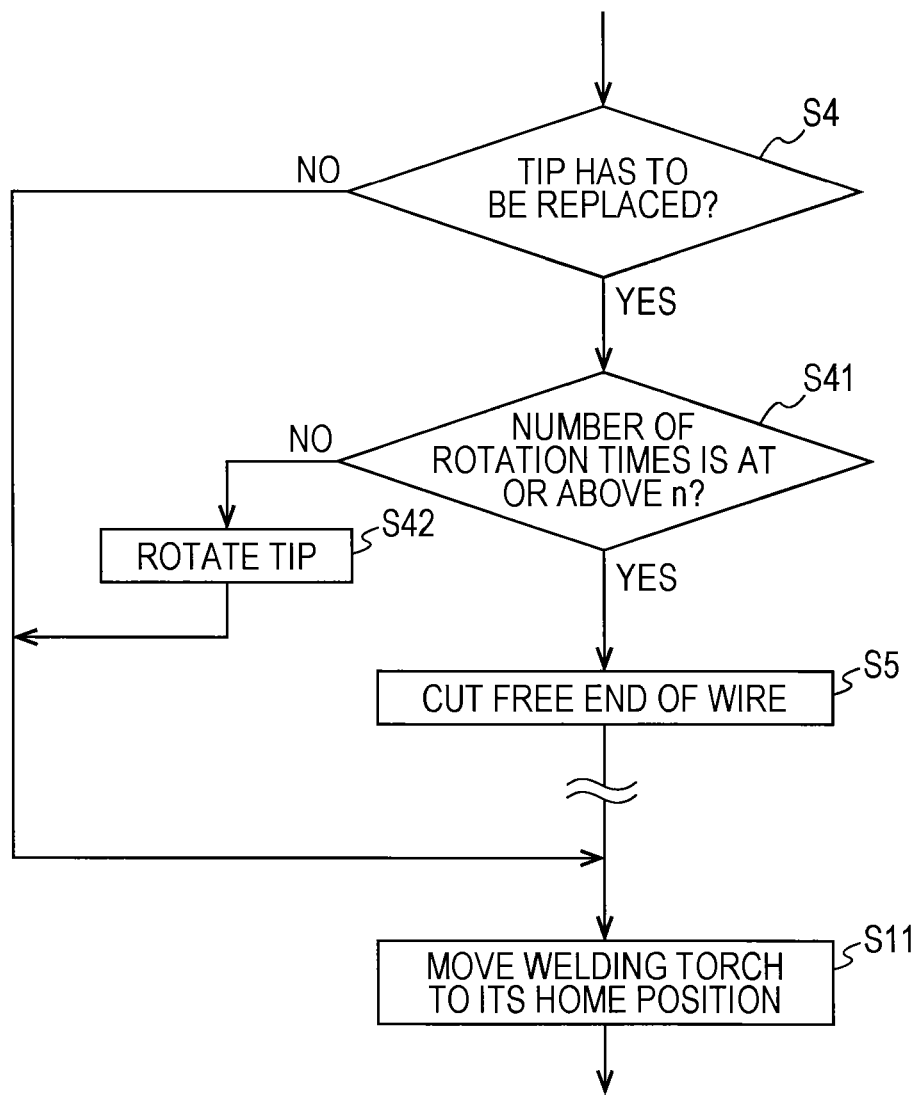
FIG. 15 is a flowchart of a welding tip rotating operation performed by the rotating mechanism.

A welding tip replacing method in this case may be conducted in accordance with the flow in FIG. 15 in a manner similar to the welding tip replacing method using the rotating mechanism.

In order to detach and attach welding tips from and to a related-art welding tip replacement apparatus, the welding tip has to be rotated a plurality of times. Furthermore, the robot arm 60 cannot be rotated by 360 degrees or more. In the related-art apparatus, therefore, it is impossible to detach and attach welding tips while rotating the tip by the robot arm 60 as described above.

While the case where the tip connection body 3 has the four fastening holes 3a has been described above, the number of fastening holes 3a is not particularly limited. Preferably, a plurality of fastening holes are arranged circumferentially. The reason is that the welding tip 1 is held in a plurality of directions in the tip connection body 3 with such a structure, such that the tip can be stably fastened along the O axis.

While the case where each fastening member 2 is spherical has been described above, the shape of the fastening member 2 is not limited to a sphere. The fastening member 2 may have any shape having a curved surface to be in contact with the fastening groove 1a. For example, the fastening member 2 may be cylindrical. Both ends of a cylinder may be tapered or semi-spherical.

What is claimed is:

1. A welding tip replacement apparatus for a welding torch that includes a tubular tip connection body, a tubular retaining member fitted over the tip connection body, and a tubular welding tip fitted within the tip connection body, the retaining member being urged toward one end of the tip connection body along an axis of the tip connection body by an elastic member, the welding torch being configured such that displacing the retaining member axially toward an other end of the tip connection body causes the welding tip axially fastened to the tip connection body to be released, the apparatus comprising:
- a first grasping mechanism that grasps the retaining member;
- a second grasping mechanism that grasps the welding tip protruding from the retaining member in a direction away from the one end or another welding tip;
- a first driving mechanism that drives the first grasping mechanism axially toward the other end to release the welding tip fastened to the tip connection body and drives the first grasping mechanism axially toward the one end to fasten the other welding tip to the tip connection body;
- a second driving mechanism that drives the second grasping mechanism axially in the direction away from the one end to detach the welding tip and drives the second grasping mechanism axially toward the other end to attach the other welding tip; and
- a cutting mechanism positioned to cut a wire, extending through the welding tip and the tip connection body, at a location between the tip connection body and the welding tip detached from the tip connection body.

2. The apparatus according to claim 1, further comprising:
a rotating mechanism that rotates the welding tip, which has to be replaced, about the axis by a predetermined angle, the rotating mechanism being positioned next to the welding tip.

3. The apparatus according to claim 1, further comprising:
at least two position sensors that acquire information about a position of the welding torch in at least two directions orthogonal to the axis.

4. The apparatus according to claim 1,
wherein the apparatus is configured to replace the welding tip with another welding tip using a pallet, and
wherein the apparatus places the welding tip attached to the tip connection body onto the pallet and attaches the other welding tip placed on the pallet to the tip connection body.

5. A welding tip replacement system comprising:
a welding torch;
a robot arm that holds the welding torch; and
the welding tip replacement apparatus according to claim 1, the apparatus being configured to replace a welding tip in the welding torch.

6. A method for replacing a welding tip for a welding torch that includes a tubular tip connection body, a tubular retaining member fitted over the tip connection body, and a tubular welding tip fitted within the tip connection body, the retaining member being urged toward one end of the tip connection body along an axis of the tip connection body by an elastic member, the welding torch being configured such that displacing the retaining member axially toward an other end of the tip connection body causes the welding tip axially fastened to the tip connection body to be released, the method comprising the steps of:
- detaching the welding tip from the tip connection body by displacing the retaining member axially toward the other end;
- cutting a wire extending through the welding tip and the tip connection body, at a location between the tip connection body and the welding tip detached from the tip connection body; and
- attaching another welding tip to the tip connection body by inserting the other welding tip into the tip connection body while displacing the retaining member axially toward the other end, and then displacing the retaining member axially toward the one end.

* * * * *